United States Patent [19]
Omi

[11] Patent Number: 5,600,445
[45] Date of Patent: Feb. 4, 1997

[54] MODULAR COPYING SYSTEM USING LIGHT WAVE, ELECTRIC WAVE, OR SONIC WAVE INTERCONNECTIONS

[75] Inventor: Kyoji Omi, Kawasaki, Japan

[73] Assignee: Ricoh Company, Ltd., Tokyo, Japan

[21] Appl. No.: 215,608

[22] Filed: Mar. 22, 1994

[30] Foreign Application Priority Data

Mar. 23, 1993 [JP] Japan .................. 5-089351

[51] Int. Cl.⁶ .............. H04N 1/00; H04N 1/40; G03G 21/00; G01D 15/00
[52] U.S. Cl. .......... 358/296; 358/401; 358/443; 346/145; 399/1
[58] Field of Search ............. 358/296, 300, 358/401, 442, 443, 468, 471, 474; 355/200, 202; 347/3, 108, 138, 145, 152, 170, 222, 245, 263; 346/145; 395/114

[56] References Cited

U.S. PATENT DOCUMENTS

| | | | |
|---|---|---|---|
| 4,691,237 | 9/1987 | Shimizu | 358/443 |
| 4,962,430 | 10/1990 | Hiroki et al. | 358/296 |
| 5,001,574 | 3/1991 | Shimizu et al. | 358/448 |
| 5,087,932 | 2/1992 | Chikane | 346/145 |
| 5,180,232 | 1/1993 | Chadima, Jr. et al. | 346/145 |

FOREIGN PATENT DOCUMENTS

| | | |
|---|---|---|
| 3337682 | 4/1984 | Germany . |
| 3426313 | 1/1985 | Germany . |
| 3522907 | 1/1987 | Germany . |
| 3935713 | 5/1990 | Germany . |

OTHER PUBLICATIONS

Siemens AG, Bestellnummer: A 19100–E686–A104–V1, 1987, "Damit Meb—Und Prufgeschichten Kurzer Werden: Die Neunen PC–Mebgerate", 8 pages.

*Primary Examiner*—Peter S. Wong
*Assistant Examiner*—Eric Frahm
*Attorney, Agent, or Firm*—Oblon, Spivak, McClelland, Maier & Neustadt, P.C.

[57] ABSTRACT

A modular copying system including combinations of printer, scanner, and system controller modules formed as independent frames. The scanner module includes devices for image reading, first data I/O and first synchronizing signal generation; the printer module includes devices for image forming, second data I/O and second synchronizing signal generation; and the system control module includes devices for third data I/O and system control. The modules are added or removed according to user requirements and the system is capable of accommodating up to seven modules. The modules are stacked in a vertical direction and arranging devices ensure proper module alignment. Once the modules are aligned and assembled in the system, communications between each module is accomplished via light wave, electric wave, or sonic wave transmission and reception. As a result, system interconnection is reduced, system noise is reduced and various connecting cables are eliminated. In addition, the system can be connected to a public ISDN line for transmitting detected system faults to the factory and for receiving fault diagnosis information which is displayed to a user via a display. Further, the system is capable of performing various image processing functions, such as processing with a space filter, image size conversion, image trimming, image movement, color image trimming, color correction, and tone conversion.

11 Claims, 25 Drawing Sheets

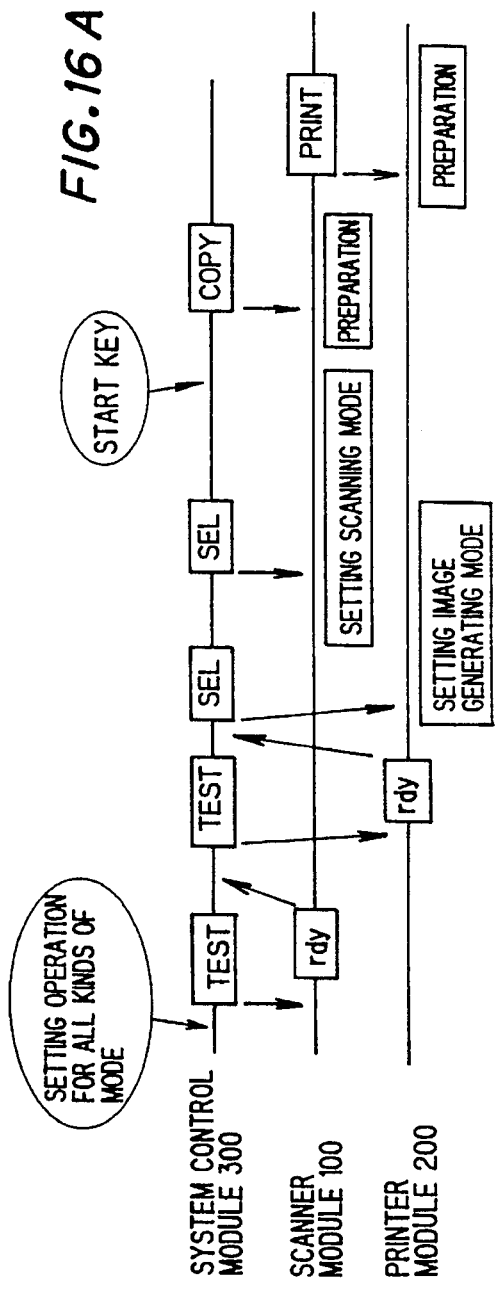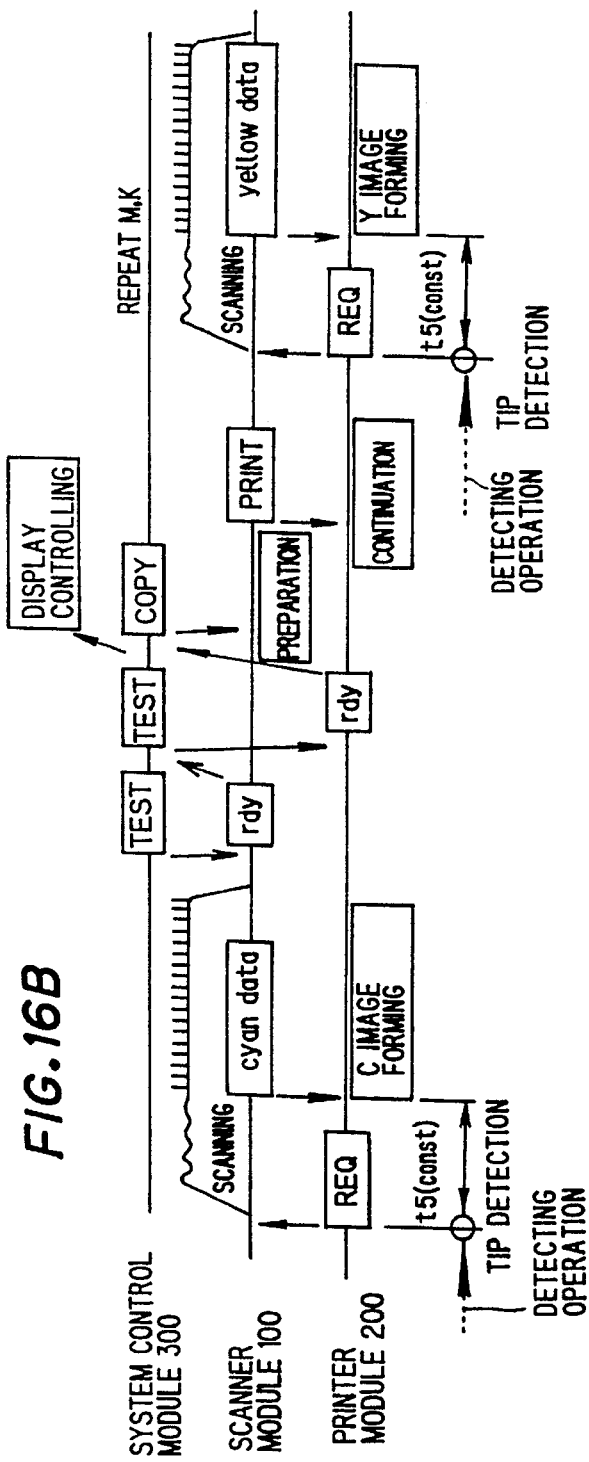

MODULAR COPYING SYSTEM USING LIGHT WAVE, ELECTRIC WAVE, OR SONIC WAVE INTERCONNECTIONS

BACKGROUND OF THE INVENTION

1. Field of the Invention

The present invention relates to a copying system which reads a manuscript picture by resolving the picture into pixels and forms an image thereof on recording paper.

2. Discussion of Background

There have been proposed various types of copying systems which read a manuscript picture by resolving the picture into pixels and forming an image thereof on recording paper. One of the typical copying systems is a digital copying machine. A digital copying machine is largely divided into a scanner section which reads a manuscript picture by resolving it into pixels and a printer section which outputs the image onto recording paper. The scanner section and printer section are integrated and packaged in a housing.

In a conventional digital copying machine, the logic architecture in the copying machine is fully modularized, and the copying function is added when the scanner section and the printer section are physically integrated.

On the other hand, in recent years, in association with the progress in the fields of image processing technology and communication control technology as well a with development of various types of image forming apparatus, a copying system has been developed which can be used as a copying machine by assembling devices such as a scanner, a printer, and a computer. Each device is developed as an independent product and the image data read with the scanner is output to the printer.

However, the conventional type of digital copying machine which is manufactured by integrating and packaging a scanner section and a printer section in a housing has inherent problems as described below.

First, although the size of copying machines has largely been reduced, the size and weight of typical copying machines, excluding ones for personal use, are still fairly large and a reduction of the unit weight is not easily achieved.

Second, it is necessary to integrate all components of the copying machine in a factory, which prevents improvement of production efficiency since this does not promote distributed production sites and the assigning of specific tasks to each production site.

Third, if it is necessary to improve the copying machine or change the design thereof, change of the entire production process for the copying machine is required, so that improvement or change of design is difficult, which in turn makes it difficult to take a quick response to social needs.

Fourth, to satisfy various needs of users as well as to optimize production and distribution costs, manufacturers incorporate as many functions as possible into a copying machine, resulting in odd and unnecessary functions for specific users. The users have no choice but to buy the expensive copying machine. Also it has been impossible to upgrade a copying machine by changing only a portion thereof.

Fifth, when a fault which cannot be repaired occurs in a portion of the copying machine, it is necessary to buy a new copying machine even though the remaining components are functional resulting in increased cost to the users.

On the other hand, copying machines manufactured by assembling components such as a scanner, a printer, and a computer each developed as independent products alleviate the first to fifth problems described above. However, the cost of the entire system increases as compared to an integrated type of copying machine, the size increases since a large space is required for installation of system components, the operability decreases, a buffer memory is usually required, copying time increases, and the copying machine performance is not comparable to an integrated type of copying machine, nor can the copying machine be adequately used in place of an integrated type of copying machine.

SUMMARY OF THE INVENTION

Accordingly, one object of the present invention is to provide a novel copying machine having the same operability and economical advantages as those of the integrated type of copying machine, while reducing the unit weight, allowing for distributed production sites and the assignment of specific production process to each production site, allowing for ease of improvement or design change, reducing the production costs of unnecessary functions by providing upgradability or partial system changes, and reducing the cost to users when a fault occurs in the copying machine.

In the copying machine according to the present invention, an image reading means in a scanner module resolves a manuscript picture into pixels according to a command from a system control module which may be integrated with the scanner module or a printer module. A first synchronizing signal generating means synchronizes to a first frequency signal and outputs image data through a first data I/O means.

The printer module, which is a separate component from the scanner module, synchronizes to a second frequency signal generated by a second frequency signal generating means and fetches the image data from a second I/O means, and an image forming means forms a permanent visual image on a recording medium based on the image data.

By allowing for independent system components, it is possible to produce, check, and ship the scanner modules and printer modules independently, and also it is possible to reduce the unit weight for transportation by packaging the modules in small lots and delivering the modules to the users through independent distribution channels. In addition, the copying machine can be realized by assembling the two modules, and if one of the modules fails, it is necessary only to replace the failed module with a new one, and reassemble the copying machine at an appropriate cost.

Also each module is arranged at a specified position with an arranging means, and data is transferred by means of light, electric waves, or supersonic waves without requiring means such as cabling to connect the modules arranged at a specified position. Thus, troublesome processes such as wiring are not necessary, and the removability and replaceability of each module is remarkably improved.

The copying system according to the present invention comprises an image reading means for reading a manuscript picture by resolving it into pixels, a first data I/O means which is an I/O interface for image data as well as for various types of control data, a first electric power supply means for supplying electric power, and a first synchronizing signal generating means for generating a first frequency signal, a scanner module formed as an independent frame, an image forming means for forming and outputting the image data as a permanent visual image on a recording medium, a second data I/O means which is an I/O interface for image data as well as for various types of control data, a second electric power supply means for supplying electric power, a second synchronizing signal generating means for generating a second frequency signal, a printer module formed as an independent frame, a third data I/O means which is an I/O interface for image data and various types of control data, a system control means for issuing commands to run the scanner module and the printer module synchronously, and a system control module formed as an independent frame. In this way, the copying system has the functions, operability, and economical characteristics equivalent to those of an integrated type of copying machine, while making it easy to eliminate or reduce cost for unnecessary functions, to upgrade the system by changing a portion of the system, and to reduce cost for users when a fault occurs.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 16A and 16B are timing diagrams for a copying operation;

DESCRIPTION OF THE PREFERRED EMBODIMENTS

Figure 1:
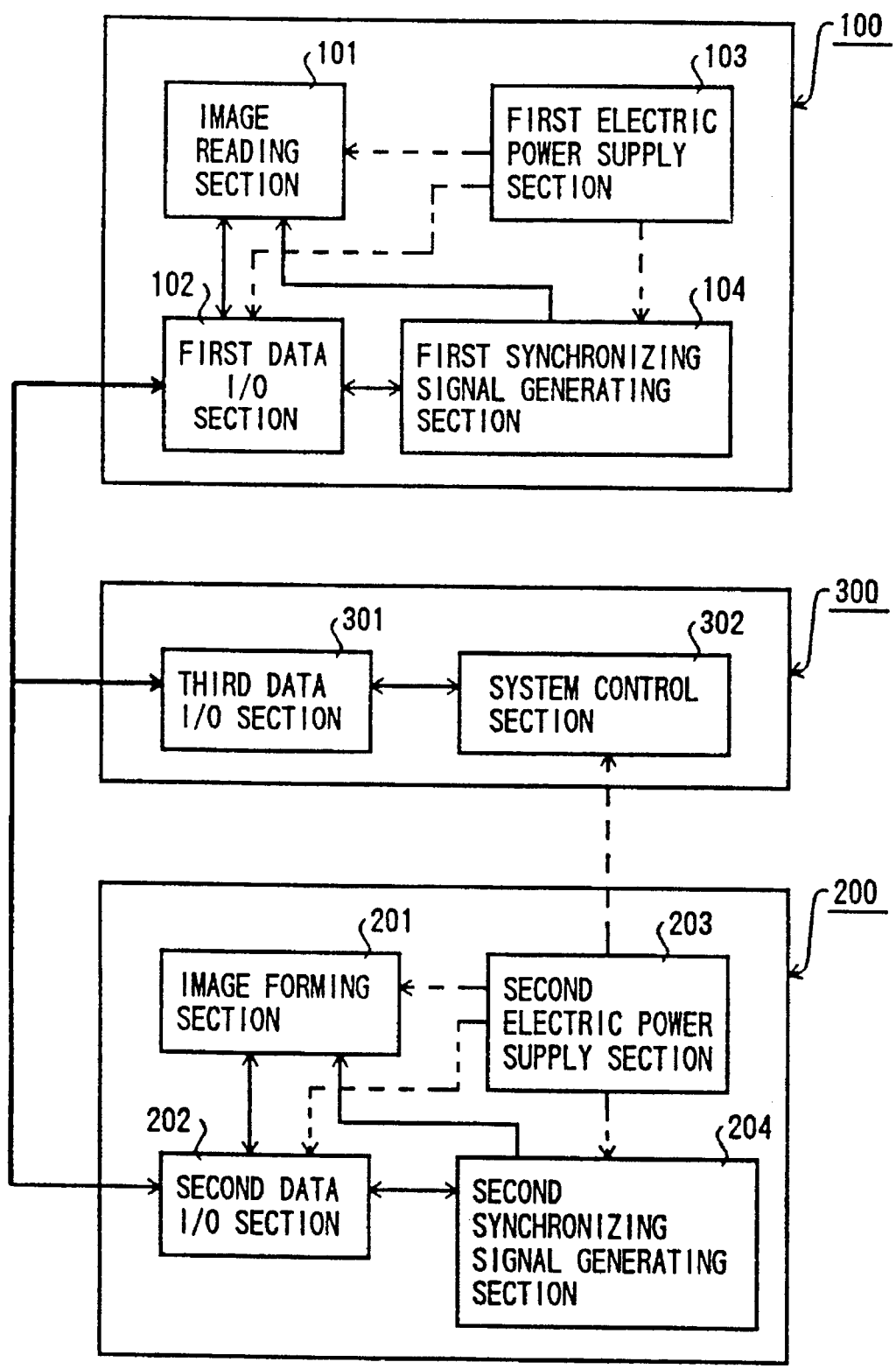
FIG. 1 is a system block diagram illustrating basic components of a copying system according to the present invention.

Referring now to the drawings, wherein like reference numerals designate identical or corresponding parts throughout the several views, and more particularly to FIG. 1 thereof, is a block diagram illustrating basic, components of a copying system according to the preferred embodiment. The copying system according to the preferred embodiment comprises three basic modules, a scanner module 100, a printer module 200, and a system control module 300.

The scanner module 100 has at least an image reading section 101 for reading a manuscript picture by resolving it into pixels, a first data I/O section 102 which is an I/O interface for image data and various types of control data, a first electric power supply section 103 for supplying an electric power, and a first synchronizing signal generating section 104 for generating a first frequency signal. The scanner module is formed as an independent frame. It should be noted that a basic image processing section 105 and an extended image processing section 106 described later are not shown.

Figure 7:
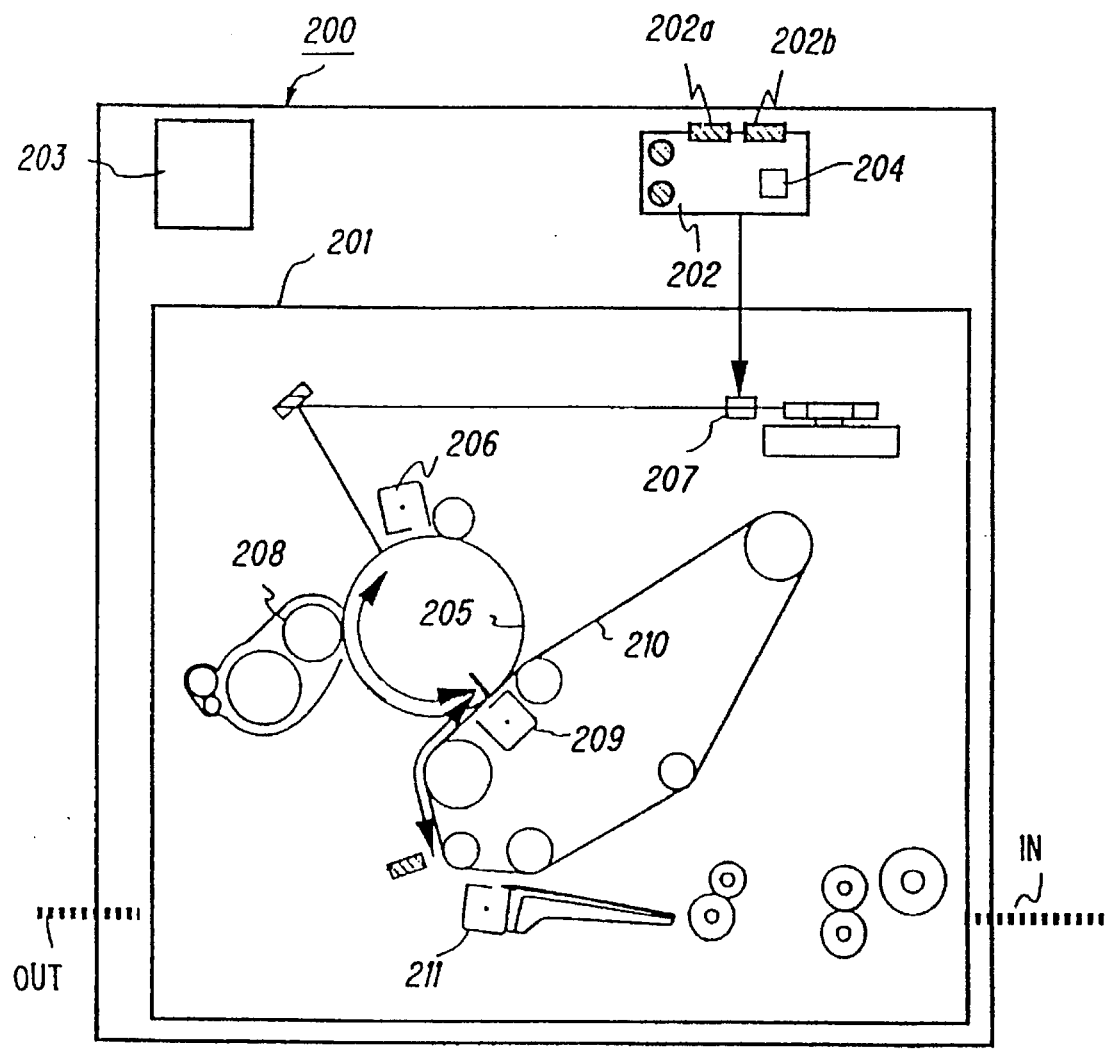
FIG. 7 is a diagram illustrating the basic functional sections of a printer module.

The printer module 200 has at least an image forming section 201 for forming and outputting image data as a permanent visual image on a recording medium, a second data I/O section 202 which is an I/O interface for image data and various types of control data, a second electric power supply section 203 for supplying an electric power, and a second synchronizing signal generating section 204 for generating a second frequency signal. The printer module is formed as an independent frame. The image forming section 201 includes image forming components such as a photosensitive drum 205, an electrifying scorotron 206, a laser exposure unit 207, a developing unit 208, primary transfer corotron 209, an intermediate transfer belt 210, and a secondary transfer corotron 211 as shown in FIG. 7.

The system control module 300 has at least a third data I/O section 301 which is an I/O interface for various types of control data, and a system control section 302 which issues commands for running the scanner module 100 and the printer module 200 in synchronous mode, and is formed as an independent frame. However, it is desirable that the frame of system control module is formed with the frame of scanner module 100 or the frame of printer module 200.

Figure 3:
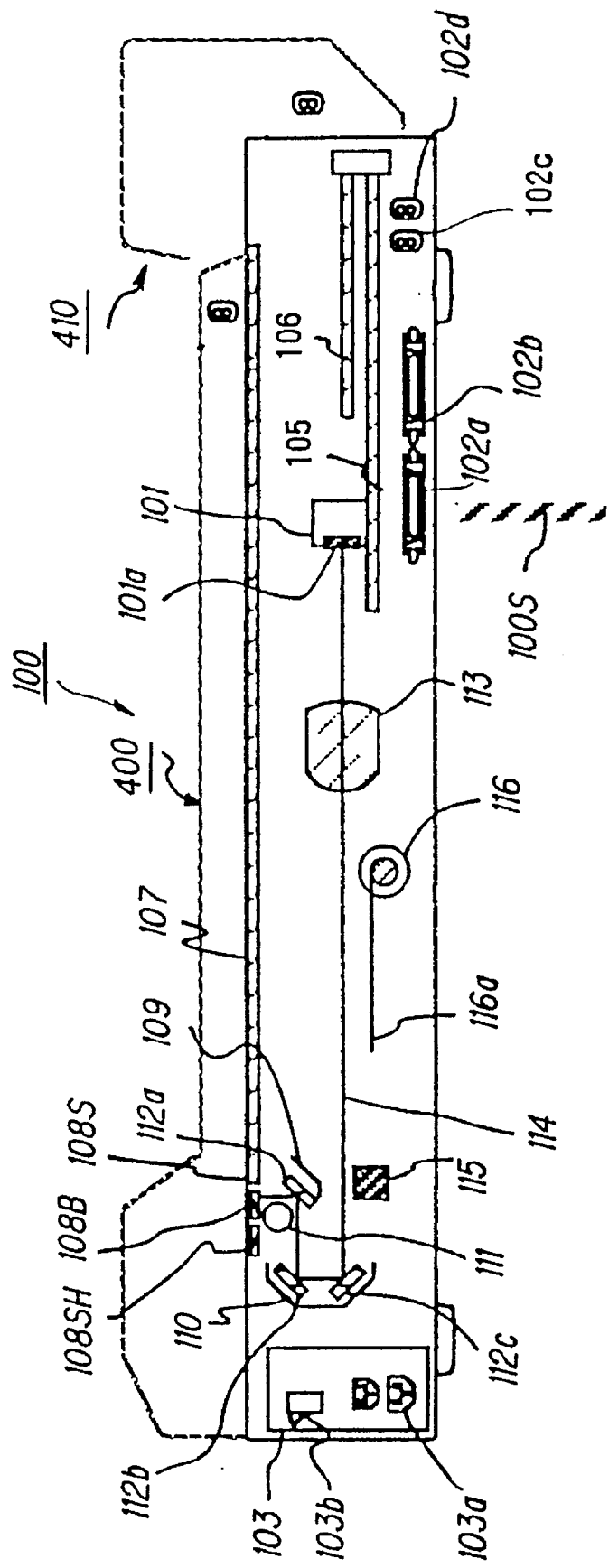
FIG. 3 is a diagram illustrating the scanner module.
Figure 8:
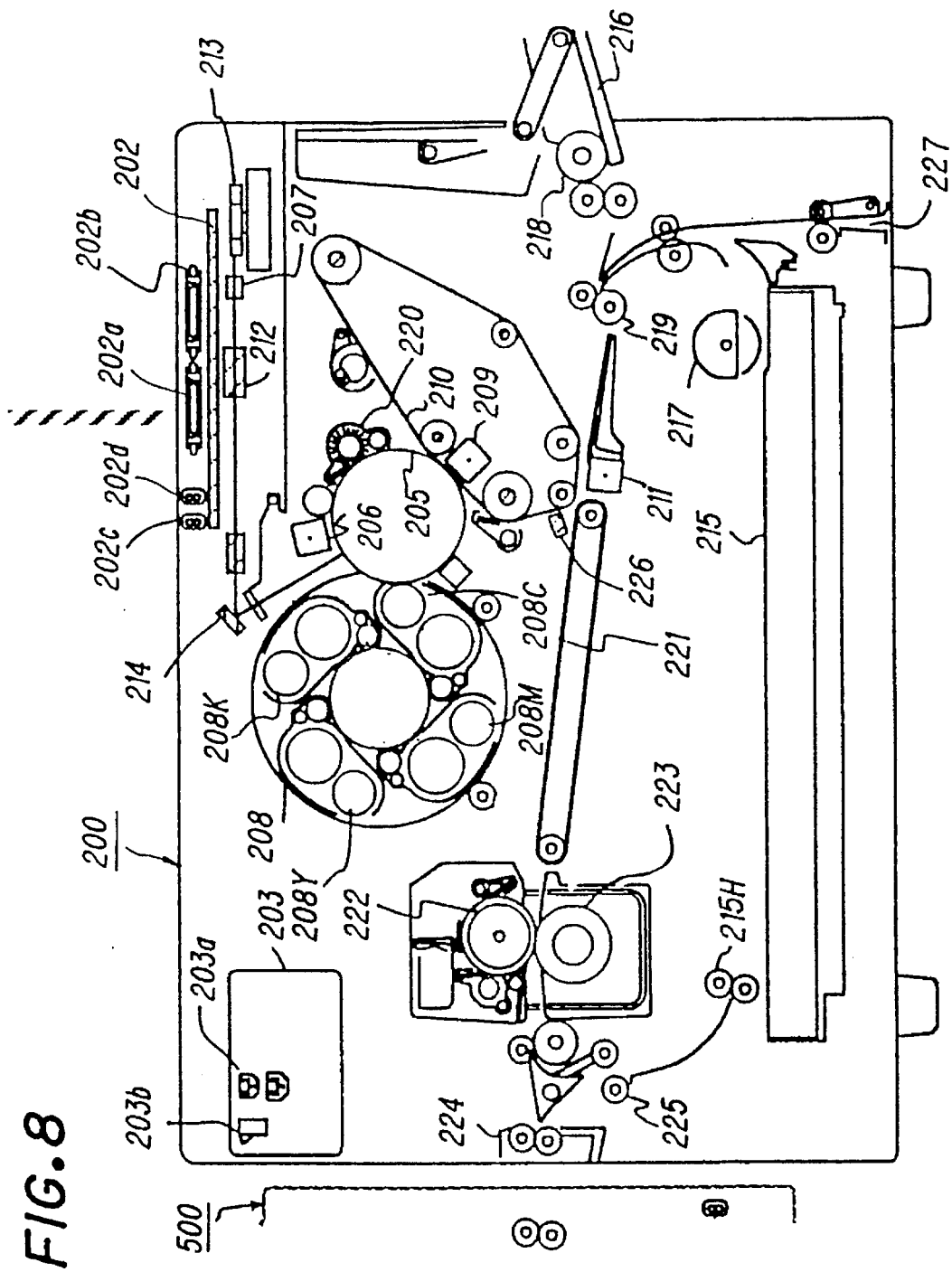
FIG. 8 is a system diagram of the printer module.
Figure 13:
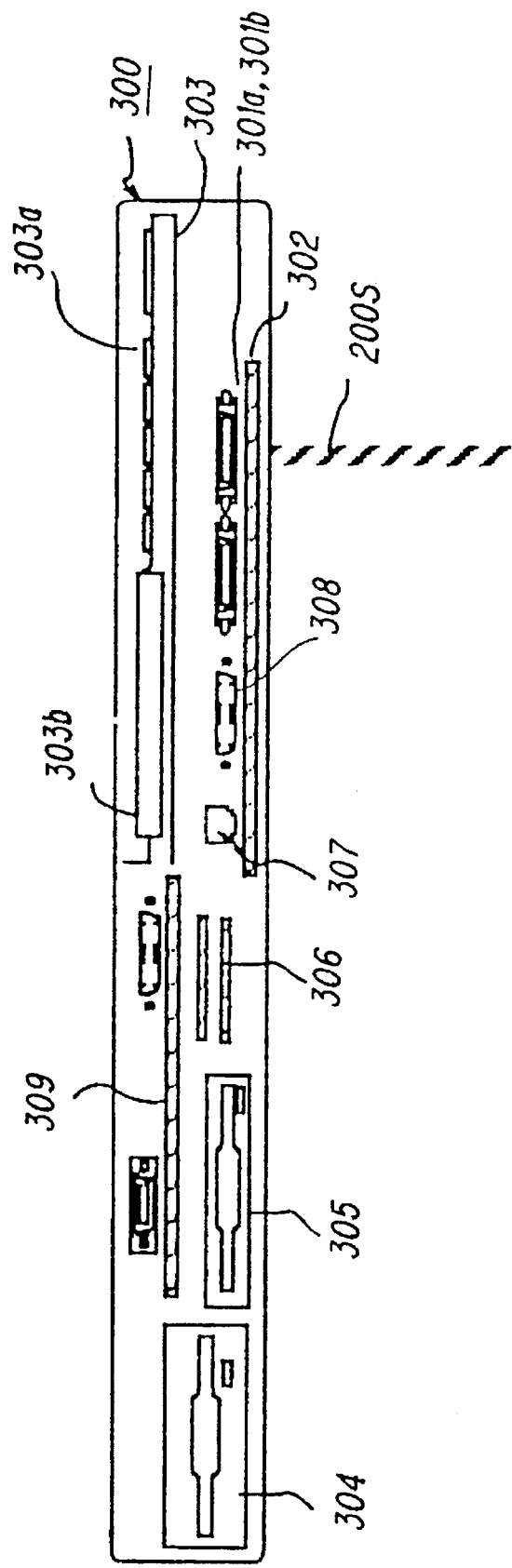
FIG. 13 is a diagram of the system control module.

These three basic modules can satisfy system functions even if they are structurally separated from each other as shown in FIG. 3, FIG. 8 and FIG. 13. In this embodiment, to satisfy the requirements of reducing unit weight during transportation and simplifying system assembly, the scanner module 100 is packaged as an individual unit, while the printer module 200 is packaged together with the system control module 300 mounted on and fixed thereto, when these modules are shipped from a factory.

Furthermore, in the preferred embodiment, convenience of use when the basic modules are assembled, beauty in appearance, users' convenience such as space efficiency, and technological problems such as prevention of electromagnetic emission, noise immunity, heat emission, mechanical resonance, are taken into consideration. For instance, when building a copying system, at least the above three basic modules and a table (or a selectable multi-stage paper feeder) are assembled, and it is preferable to assemble the components in the vertical direction for higher space efficiency, and also select a height of a platen to preferably be in a range from 900 mm to 1100 mm for better operability while processing a manuscript. Also various types of operation buttons should preferably be arranged on the same plane as the platen surface or at a slightly lower level to improve a human interface.

To satisfy the requirements as described above, in the copying system according to the preferred embodiment, each basic module's footprint is almost identical to eliminate ill-shapedness when the basic modules are stacked and to prevent the modules at higher positions from falling down and to achieve the positional relation between the platen and the surface of the operating unit as described above. Also from viewpoints of good appearance and safe electromagnetic environment, a number of cables used for connection between the basic modules has been reduced as much as possible, and the positions of terminals are arranged so that a length of cable between terminals is as short as possible. When it is necessary to realize only a copying function, the system control module 300 can be built with an extremely compact configuration, so that the system control module 300 can be incorporated as a part of other module. In that case, the considerations as described above are required only in relation to the positional relation between the two modules to be integrated.

Figure 2:
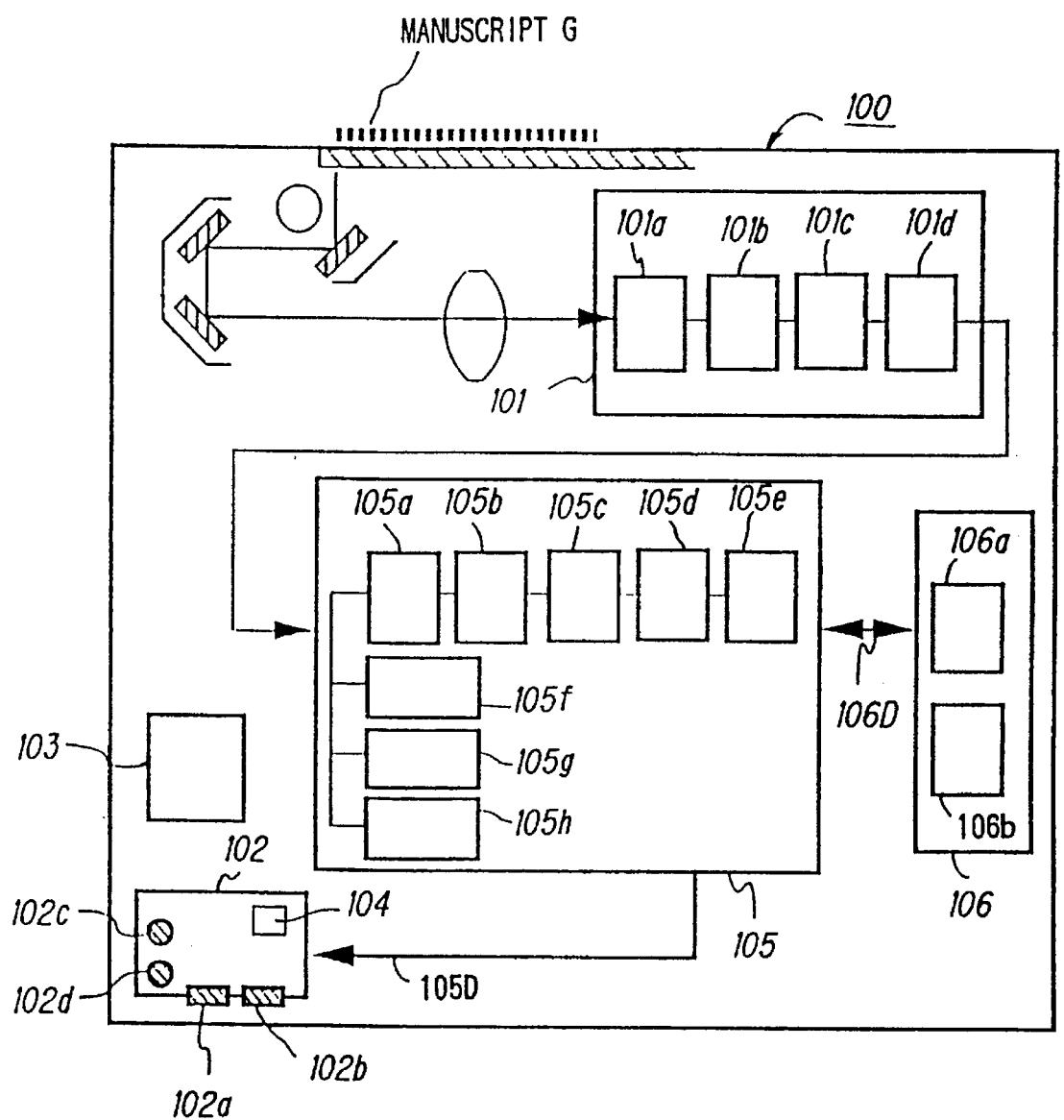
FIG. 2 is a block diagram of a scanner module.

FIG. 2 is a block diagram illustrating basic functional sections of the scanner module 100. The scanner module according to the present invention comprises an image reading section 101 to read a manuscript picture by resolving it into pixels as previously described, a first data I/O section 102 which is an I/O interface for image data and various control data, a first power supply section 103 to supply an electric power, a basic image processing section 105, and an extended image processing section 106. It should be noted that, in this embodiment, a first synchronizing signal generating section 104 is arranged in the first data I/O section 102. All of these components are packaged in the scanner module 100.

The image reading section 101 comprises a color imaging device 101a, an analog/digital convertor (described A/D convertor hereinafter) 101b, a shading correction circuit 101c, and a sampling displacement compensation circuit 101d.

The first data I/O section 102 has a plurality of SCSI connectors 102a and 102b each having the same form as well as the same interface, optical fiber connectors 102c and 102d for communications with an optional scanner, and a first synchronizing signal generating section 104.

The basic image processing section 105 comprises a space filter circuit 105a, a multiplying circuit 105b, a color processing circuit 105c, a tone processing circuit 105d, an image adding circuit 105e, an image area auto-separating circuit 105f, a color manuscript auto-detecting circuit 105g, and a securities detection circuit 105h.

The space filter circuit 105a executes operations for smoothing and/or sharpening. Generally, when a manuscript G is a screen tone printed material, the former processing is carried out, and when the manuscript G consists of only letters, the latter processing is carried out. Selection is input from a manuscript select screen such as a console, or is automatically made according to a result of separation in the image area auto-separating circuit 105f.

The multiplying circuit 105b changes a size of an image by 25% to 400% in the primary scanning direction. It should be noted that a size of an image in the secondary scanning direction is changed by changing the image reading speed (secondary scanning speed).

The color processing circuit 105c has a function for masking manuscript picture RGB signals to convert the signals to C (Cyan), M (Magenta), Y (Yellow), and K (Black) image signals. Furthermore the color processing circuit 105c executes adaptive color processing in which an appropriate color processing is executed according to whether an image is a character image or a light and shade one, for instance, to convert a section of black characters to a pure black image. Also the color processing circuit 105 passes RGB signals through the first data I/O section 102 and outputs the signals to the system control module 300.

The tone processing circuit 105d executes dither processing from any of 8-bit C, M, Y, K image signals to generate a 2-bit record image signal. Furthermore the tone processing circuit 105d executes an appropriate tone conversion for a character image and a light and shade image.

The image adding circuit 105e generates small pattern data for tracing patterns in securities to prevent securities from being illegally copied and added to the manuscript picture data.

The automatic image area separating circuit 107f recognizes a character image section and a light and shade image section of a manuscript picture, pixel by pixel, and outputs the result to the space filter circuit 105a, the color processing circuit 105c, and the tone processing circuit 105d.

The automatic color manuscript detecting circuit 105g executes processing for discriminating a color manuscript from a monochrome manuscript.

The securities detecting circuit 105h makes a determination as to whether the manuscript G is one of the securities which should be inhibited from being copied.

The extended image processing section 106 comprises an area-specific image processing circuit 106a and an image editing circuit 106b. The extended image processing section 106 is provided near scanner module 100 so that it can optionally be incorporated according to a user's needs.

FIG. 3 is a diagram of the scanner module 100. In this figure, element 103 is a first electric power supply section, 103a is a power supply plug for connection to commercial electric power, 103b is a power switch, 107 is a platen glass, 108S an image reference position, 108SH is a white board for correcting shading, 108B is a bar code for recognizing a solid object, 109 is a first carriage, 110 is a second carriage, 111 is a lamp for the manuscript, 112a to 112c are first to third mirrors respectively, 113 is an image forming lens, 114 is an optical axis of the lens, 115 is a carriage home sensor, 116 is a manuscript picture scanning motor, and 116a is a driving wire. Also 100S is a line for transferring data from the scanner module 110 to the system control module 300 or the printer module 200. It should be noted that the dotted line 400 in the figure indicates an optional automatic manuscript feeder.

Figure 4:
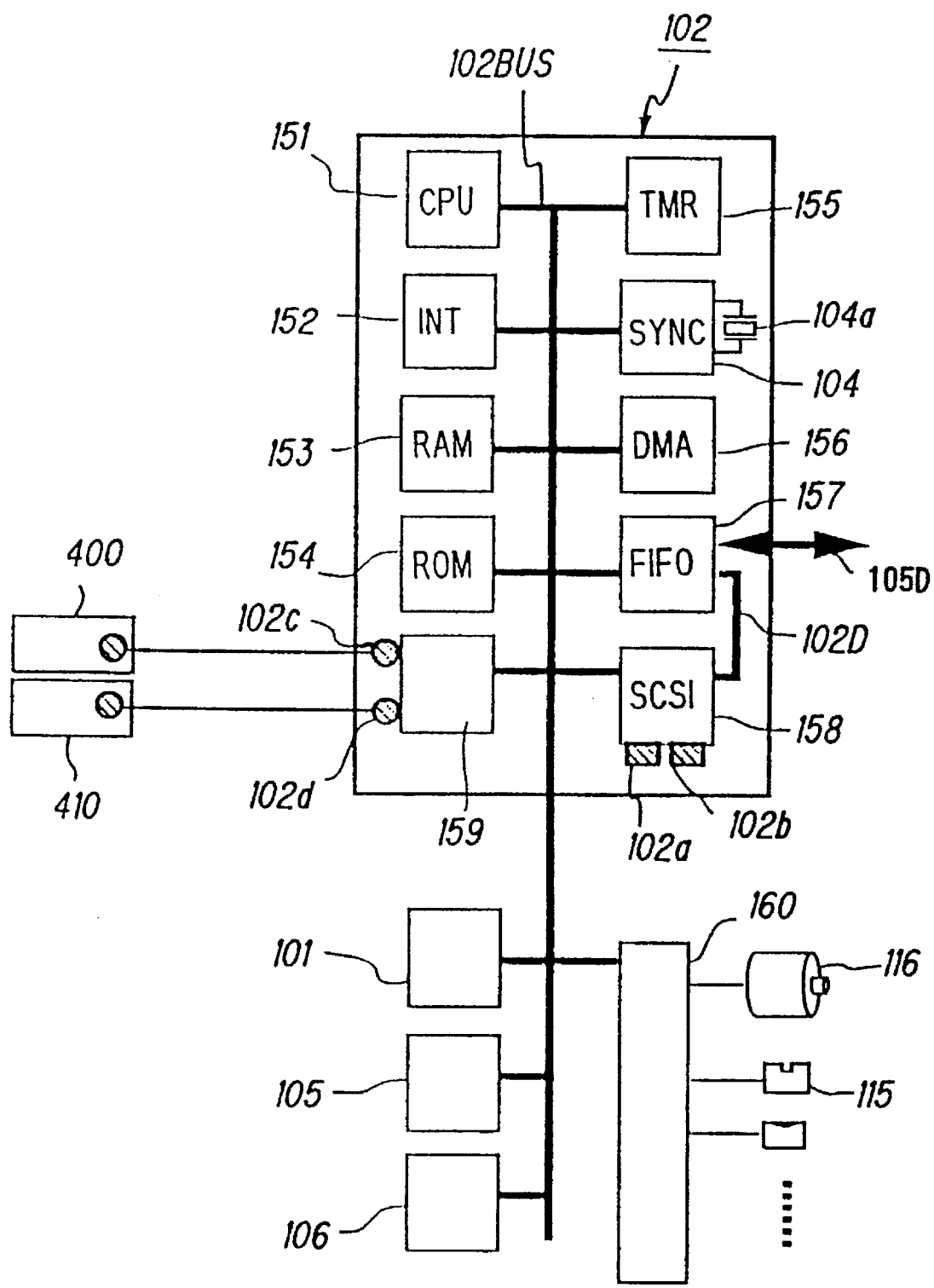
FIG. 4 is a diagram illustrating components of a first data I/O section.

FIG. 4 is a block diagram of the first data I/O section 102. In this embodiment, communication with other modules is controlled in data I/O section 102. In this figure, element 151 is a microprocessor (CPU), 152 is an interrupt controller, 153 is a read/write memory (RAM), 154 is a read-only memory (ROM), 155 is a timer counter (TMR), 156 is a DMA controller, 157 is a first-in first-out memory (FIFO), 158 is an SCSI controller, 159 is a controller for optical fiber connectors, 102c and 102d, 104a is a crystal oscillator for the first synchronizing signal generating section 104, 102BUS is a data bus, and 102D, and 105D are image data channels respectively. Also in this figure, element 160 is an I/O circuit for such components as a sensor and a motor, while elements 400 and 410 are in automatic manuscript feeder and a film projector connected to each other through the optical fiber connectors 102c and 102d respectively.

In the preferred embodiment of the present invention, manuscript G is placed on the platen glass 107 with a surface to be copied facing downward and aligned with reference position 108S at the left edge section of the platen glass. The image forming lens 113 forms an image of the manuscript picture on a light receiving surface of the imaging device 101a. The imaging device 101a generates a color image using a charge coupled device, and an R image pickup section covered with a red filter in which 4752 pixels are arrayed one-dimensionally, a G image pickup section covered with a green filter in which 4752 pixels are arrayed one-dimensionally, and a B image pickup section covered with a blue filter in which 4752 pixels are arrayed one-dimensionally. The R, G, and B pickup sections are arrayed parallel to each other in the primary scanning direction. The three scanning lines are close to each other, and the space between each scanning line is 4/16 mm on the manuscript picture plane. It should be noted that the direction for scanning by this one-dimensional imaging device is called primary scanning direction and the direction crossing the primary scanning direction at right angles is called secondary scanning direction.

The illuminating lamp 111 and the first mirror 112a are mounted on first carriage 109, while the second mirror 112b and the third mirror 112c are mounted on the second carriage 110. When reading a manuscript picture, the first carriage 109 and the second carriage 110 are driven at the secondary scanning speed Vsub and Vsub/2, respectively, for scanning from the left edge to the right edge by the manuscript picture scanning motor 116 and the driving wire 116a, without the optical conjugate relation between them being lost. It should be noted that the manuscript scanning motor 116 is a stepping motor.

The secondary scanning speed Vsub can be changed in a range from 1/8 to 4 times of the standard speed in 1% increments, and the speed can be set to an appropriate level according to a command from other modules.

Figure 5:
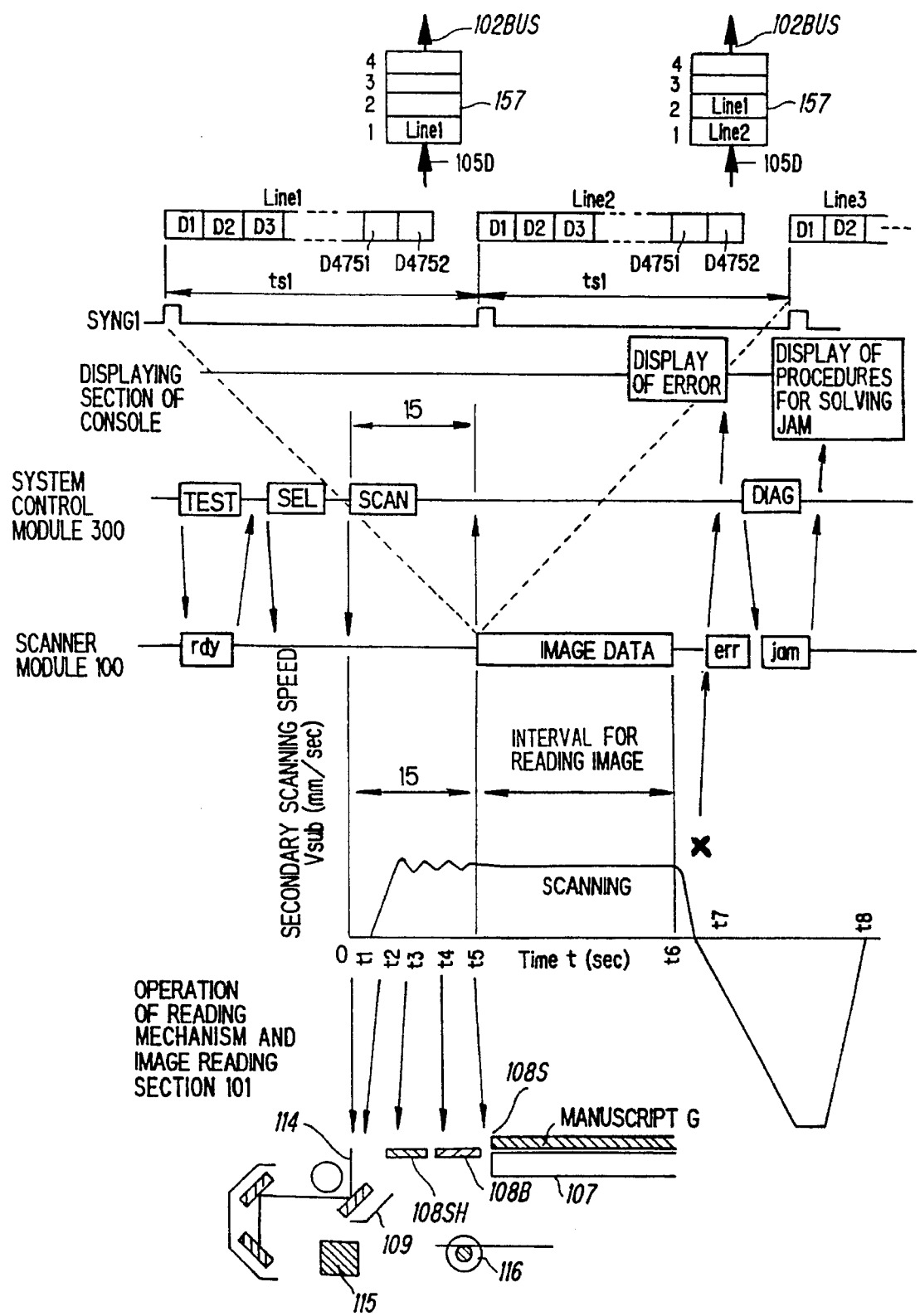
FIG. 5 is a timing diagram of an image reading mechanism section.

Next, an operation for scanning a manuscript picture is described with reference to the timing diagram shown in FIG. 5. The first carriage 109 is positioned under the carriage home sensor 115 and while waiting for input instruction sensor 115 is ON. When the read scan instruction SCAN or REQ is received, the illuminating lamp 111 is turned ON at t1, the motor 116 is driven, and scanning in the secondary scanning direction (rightward in the figure) is started. After t2, the first carriage 109 is no longer under the carriage home sensor 115, the sensor is turned OFF and the position is stored as the scan reference position, which is used as a reference point for positional calibration. The first data I/O section 102 computes an optimal acceleration program for achieving a precision required for arrival to the image tip reference position 108S (t5), the speed Vsub, and a step pulse series for the motor 116. The subsequent carriage speed is driven according to this pulse series, and the time required for reaching the image tip reference position 108S and a desired constant scanning speed can be obtained.

After passing the calibration reference point, the imaging device 101a reads images for each color projected through the lens 113 on the primary scanning line. This is convenient to stabilize the time required for accumulation of electric charge in the imaging device 101a to a constant level. The primary scan cycle is a pulse series cycle tsl generated from the first synchronizing signal generating section 104, and the pulse series is connected through the bus 102BUS to the image reading section 101. It should be noted that the first synchronizing signal generating section 104 divides and outputs the original oscillation frequency of the crystal oscillator 104a to the bus 102BUS.

The total number of pixels in the imaging device 101 is 4752. The imaging device 101a reads an original picture by resolving it to 16 pixels/mm in one primary scanning line and sampling the image, and outputs analog voltages corresponding to RGB reflected light, pixel by pixel, from the manuscript picture. Then the analog voltage is converted to an B-bit digital signal (namely quantized to any of 256 tones) by the A/D convertor 101b, the signal being sent to a circuit in the next stage.

After passing the reference point above, the imaging device 101a reads the white reference board 108SH at t3, which is converted to an 8-bit digital value and stored in the shading correcting circuit 101c. Then, shading correction is executed on the image data read. At t4, when the first carriage 109 passes under the individual identification bar code board 108B for tracking illegal copy of securities as well as for remote service, the imaging device 101a reads the image, and the image data is transferred to the system control module 300.

Also, when the first carriage 109 reaches the image tip reference position 108S at t5, the image reading section 101 reads the manuscript picture by scanning line-by-line and successively outputs the image data as color resolution digital data for each image to the basic image processing section 105.

When the entire A3 size manuscript picture consisting of 6720 scanning lines is read and the first carriage 109 reaches the right edge at t6, the motor 106 is rotated in the reverse direction to return the first carriage 109 to the home position (position of the sensor 115) where it is stopped to prepare for next scanning operation.

The RGB image data for the manuscript picture read as described above is processed in the basic image processing section 105 as follows. The RGB image data is input in parallel to the space filter 105a, the automatic image area separating circuit 105f, the automatic color manuscript detecting circuit 105g, and the securities detecting circuit 105h.

Functions of the basic image processing section 105 can be divided into the following two categories. The first category includes functions which support image processing, such as an image area separating process for discriminating a character area from a gradated image area, a process for detecting a manuscript size, and a process for discriminating a color manuscript from a monochrome manuscript. Also the functions belonging to this category include a process in which the entire manuscript picture on the platen glass 107 must be checked, such as a process for discriminating a color manuscript from a monochrome manuscript. This type of processing is executed prior to forming a copy image and is generally referred to as a prescan.

Functions belonging to the second category require processing of an image signal, such as processing with a space filter, image size conversion, image trimming, image movement, color image trimming, image movement, color correction, and tone conversion. The processes are further divided to those having common processing operations in some image area such as image size conversion and those having different processing operations in some image area, such as processing a character image section and a light and shade image section tone processing.

Processing belonging to the first category is in most cases sent to the system control module 300. The system control module 300 receives results from other system components and executes a process to form an image by issuing control commands according to the results received from other devices. For example, when the basic image processing section 105 determines that a manuscript picture is a monochrome one it sends the result of the detection through the first data I/O section 102. to the system control module 300 which sends a command such as K development energize, or CMY development stop to the printer module 200 in response. Then, the second data I/O section 202 in the printer module 200 energizes only the K developing unit 208K and stops development of other colors to efficiently form the monochrome image.

Processing belonging to the second category is divided into cases where the K developing unit 208K is automatically energized according to a result of processing belonging to the first category, where an instruction is entered by an operator from a console, and where processes belonging to the first and second categories are combined. As an example, a process for deleting a specified color image requires that a specified color contained in a manuscript image is deleted, while other color images are stored to form an image on recording paper. This processing is performed by the color processing circuit 105c in the basic image processing section 105 and it should be noted that an instruction for specifying a color to be deleted is entered from a console by an operator.

In either category one or two processing, in the copying mode, RGB image signals inputted from the basic image processing section 105 are ultimately converted to C, M, Y and K signals for recording and the data is transferred to the printer module 200.

It should be noted that when a process for converting the manuscript picture to a monochrome image is executed "0" is output for signals other than the K signal.

The first data I/O section 102 communicates with the system control module 300 or the printer module 200 according to a specified protocol, controls the scanner module 100 energizing and reading of a manuscript picture, and outputs manuscript picture data. Also the first data I/O section 102 controls the devices inside the scanner module 100 and an optionally added device such as an automatic manuscript feeder.

In addition, in a conventional system, such as an optical filing system in which the image reading section 101 and the image forming section 201 comprise separate modules, a page buffer memory is required between the two modules. In this type of configuration, however, a time lag is introduced between the image reading step and the image forming step. This time lag creates an undesirable result of an increase in the first copy time. To solve this problem, in the present invention according to the preferred embodiment, a page buffer is eliminated to reduce costs but the image reading step to the image forming step must be synchronized. Namely, image reading and image forming must be carried out without any substantial time lag. The synchronization between image reading and image forming steps requires maintaining coincidence between cycles and header phases.

If the synchronism between cycles is not maintained, a fault such as an extended or shrunk copy image results and if synchronization between header phases is not maintained, a copy image position cannot be reproduced correctly on the recording paper.

Furthermore, in the color copying system using a printer based on a system in which CMYK images are successively formed, as in this embodiment, the printer module 200 forms an image by successively superimposing CMYK images. To realize such a system which can be sold at a low price in the market, it is preferable to eliminate a page buffer memory, it is preferable that the scanner module 100 scans one sheet of manuscript four times and one of the C, M, Y or K color image is sent each time the manuscript is scanned. For this reason, it is very important to maintain an accurate scanning position of the manuscript while it is successively scanned, and, namely, to maintain synchronism. If synchronism is lost, color print displacement occurs, and a correct color image cannot be obtained.

Description of how the preferred embodiment of the present invention achieves the objects as described above is made with reference to FIG. 5. FIG. 5 shows operational timing for scanning a manuscript one time, and the details of the operation for scanning by two scanning lines are shown in the upper part of the figure. When the first carriage 109 receives the SCAN command from the system control module 300, the optical axis 114 of the first carriage 109 reaches the image tip reference position 108S at time t5. This occurs after the first carriage 109 receives a command from the first data I/O section 102 as described previously with the secondary scanning speed adjusted to Vsub. In this way, image data is always outputted at a time t5 after the command is received, so that phase synchronization is maintained. It should be noted, that in order to achieve the above objective, sensor 115 for detecting the carriage reference position is provided, first carriage 109 is calibrated each time scanning is performed with reference to the scanning reference position, and at the same time the secondary scanning travel of the stepping motor (manuscript scanning motor) single step is held under $\frac{1}{16}$ mm. A system such as a micro step driving system can be used as the motor driving system.

Furthermore, to establish cycle synchronization, one primary scanning line is read in synchronism to the pulse series cycle tsl generated by the first synchronizing signal generating section 104, and the data obtained through the scanning is sent to the FIFO 157. The side receiving the scanned data (the scanner module 100 in FIG. 5) successively reads the data in substantially the same cycle as cycle tsl. In copying mode, the printer module 200 receives the image data in order to maintain the cycle synchronization as described above. For this reason, image data can be received in a constant time after a command is received irrespective of how many times a manuscript is scanned, and also a correct positional relation between paper and an image (registration) can always be maintained. Furthermore, a buffer memory is not required in color copy mode, since correct registration of color print section is maintained, resulting in a copy being output quickly.

It should be noted that the scanner module 100 receives the commands described above from the other two modules (system control module 300 and the printer module 200).

Figure 6:
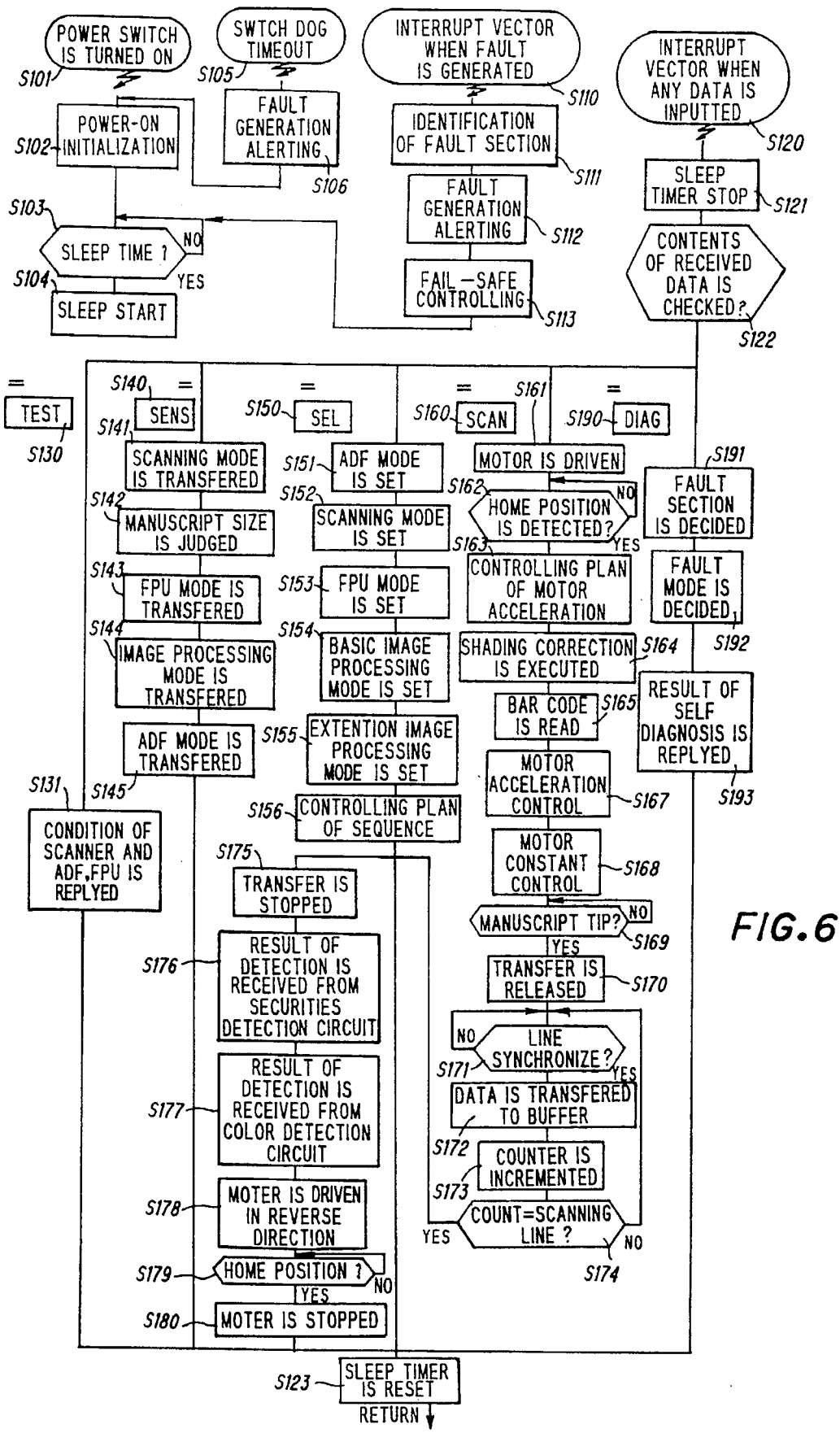
FIG. 6 is a flowchart illustrating functions of the first data I/O section.

FIG. 6 is a flowchart illustrating other functions of the first data I/O section 102. These functions are executed according to a program executed by microprocessor 151 shown in FIG. 4. The program to be executed is stored in the ROM 154. Step S101 corresponds to the step of turning ON the power switch 103b, while the reference numeral S102 corresponds to a system initialization step including setting initial parameters for various types of circuit element, watch dog timer start, and moving the first carriage 109 to the initial position.

At step S103 a determination is made as to whether or not a command from the SCSI connectors 102a and 102b comes in at specified timing (time-out time).

Step S104 corresponds to stand-by mode in which power is disconnected from the image reading section 101, supply voltage to the basic image processing section 105 and the extended image processing section 106 is lowered allowing limited data storage in each circuit register. Step 104 results in a reduction of power consumption (stand-by mode) and a reduction of noise generated by a cooling fan.

The watch dog time out function indicated by step S105 is generated when the watch dog timer is not in normal execution mode, and at this point in time the fault generation alerting function indicated by step S106 issues a watch dog time out signal to the system control module 300.

When a fault is generated in either the basic image processing section 105 or the extended image processing section 106, an interrupt vector step S110 is executed, and identification of the faulty section and analysis of causes for the fault are executed at step S111. The result of the above operations are sent to system control module 300 at step S112, and a fail-safe processing step S113 is executed to prevent damage due to, for example, fire caused by motor 116 overheating.

Interrupt vector step S120 is executed when any data is input to the SCSI connectors 102a and 102b, and sleep time is stopped at step S121. At step S122, the contents of the received data is checked, and system operation is branched to any of the operations described below.

At step S130 an inquiry is made as to whether the scan module 100 is ready for scanning a manuscript or is in TEST mode (TEST unit ready). A reply as to whether or not the scanner module 100 including optionally added devices 400 and 410 are ready is given at step S131.

Step S140 corresponds to the SENS mode (mode SENSe) in which an inquiry is made as to various operating mode setups in the scanner module 100. A reply as to the scanning mode currently set up on the scanner module 100 including the optionally added devices 400 and 410 is given based on a result of processing in steps S141 and S145.

Step S150 corresponds to the SEL (mode SELect) request path for requesting a mode to be set up in the scanner module 100, and this path is paired with the SENS path described above. Various parameters are selected through each of the routines of steps S151 and S156.

Step S160 corresponds to a path for issuing a SCAN or COPY request, and this request is issued once for one manuscript in ordinary monochrome processing, and in case of color processing the request is issued once in the RBG processing, and the request is issued four times successively in case of CMYK processing. When issuing this request, at first the motor 116 is driven at step S161, passage of the first carriage 109 is detected at step S162 by monitoring sensor 115, and a calibrating operation for resetting the position counter provided in the memory 153 is executed. This counter is incremented every scanning line by a synchronization pulse output from the first synchronizing signal generating section 104. At step S163, a program for driving motor 116 is computed so that the first carriage 109 reaches the image tip reference position 108S at the correct time (time t5 after a SCAN or COPY request is received) and also so that scanning will occur at the scanning speed of Vsub set up according to the SEL request mode selection.

Next, the reference white board 108SH is read at step S164, parameters for correction of shading are computed and set, and the results are used in shading correction of a subsequently read image data. Then the individual identification bar code plate 108B is read at step S165, control for accelerating rotational speed of the motor is provided at step S167, and when the desired rotational speed is obtained the control is switched for constant speed at step S168. Step S169 monitors whether or not the value provided by the counter indicates that first carriage 109 is at the manuscript edge position and if so, the system control goes to step S170.

At step S170, an input enable gate of FIFO 157, which is a buffer memory for image data, is enabled to prepare FIFO 157 for receiving image signals from the basic image processing section 105 through the image signal line 105D. In subsequent steps S171 to S174 manuscript picture data is sent to the FIFO 157, and a synchronizing pulse generated by the first synchronizing signal generating section 104 for each scanning line is detected at step S171. At step S172, image data for 4752 pixels per scanning line is stored via image signal line 105D in the FIFO 157. Then, the carriage position counter is incremented at step S173. At step S174, the above loop is repeated for the entire area of the manuscript picture, for example, in case of A3 paper size, the loop is repeated for 6720 scanning lines (in other words 6720 times). When the scanning of the entire area of one picture is completed, the input enable gate of the FIFO gate 157 is disabled at step S175, a result of detection is received from the securities detection circuit 105h at step S176, a result of color detection is received from the automatic color manuscript detecting circuit 105g at step S177, and the above data is transferred through the bus 102BUS.

Next, the motor is driven in the reverse direction at step S178, a home position is detected at step S179, and operation of the motor 116 is stopped at step S180. The sleep timer is activated at step S123.

Step S190 corresponds to when self DIAG (DIAGnostic) is requested by the scanner module 100, and this request is typically issued after a detection of a fault (steps S106 and S107 described above), and the self diagnosis and reply to the request are executed at steps S191 to S193.

The area-specific image processing section 106a processes an area of a manuscript picture specified by the operator which is different from the general area of the manuscript picture. Also the image edit circuit 106b performs various image processing functions including mosaicking, solarization, posterization, conversion to high contrast image, and conversion to line image.

An image trimming process is one example of the image processing performed by the area-specific image processing circuit 106a. Image trimming is a process to duplicate a specified area of a manuscript picture and render the remaining portion blank. The well-known technology, such as the technology disclosed in Japanese Patent Laid-Open No. 159570/1987, can be used for this processing. However, when using this technology the manuscript must be marked-up with a felt pen which may damage manuscript. To solve this problem, in the present embodiment, a manuscript picture is read by the prescan, the image data is displayed, an operator enters instruction for specifying the trimming range while watching the displayed image and using the cursor move key and the select key, and the specified area is rendered blank by the area-specific image processing circuit 106a.

FIG. 7 is a block diagram illustrating basic functional sections of the printer module 200. This module consists of the image forming section 201 which forms and an output image data as a permanent visual image on a recording medium, a second I/O section which is an I/O interface for image data as well as for various types of control data, a second electric power supply section 203 for supplying an electric power, and a second synchronizing signal generating section 204 for generating a second frequency signal. Also, in this embodiment, the second synchronizing signal generating section 204 for generating the second frequency signal is provided in the second data I/O section 202. The second data I/O section has a plurality of SCSI connectors 202a and 202b each having the same form and the same interface. All of these are packaged in the printer module 200. The designations IN and OUT in FIG. 7 indicate the direction in which the recording paper is fed. It should be noted, as described above, that the image forming section 201 is an assembly consisting of image forming elements such as the light-sensing body drum 205, the electrifying scorotron 206, laser exposure unit 207, developing unit 208, primary transfer corotron 209, intermediate transfer belt 210, and secondary transfer corotron.

FIG. 8 is diagram of the printer module 200. In this figure, element 203 is a second electric power supply section, 203a is a power supply plug for connection to commercial electric power, 203b is a power switch, 205 is a photosensitive drum, 206 is an electrifying scorotron, 207a is a laser exposure unit, 208 is a developing unit, 209 is a primary transfer corotron, 210 is an intermediate transfer belt, 211 is a secondary transfer corotron, 212 is an F0 lens, 213 is a rotational multi-faced mirror, 214 is a mirror, 215 is a cassette for automatically feeding paper with both sides of the paper available for copying, 216 is a manual paper feed tray, 217 and 218 are paper feed rollers, 219 is a resist roller pair, 220 is a cleaning unit, 221 is a transfer belt, 222 is a fixing roller, 223 is a fixing backup roller, 224 is a paper discharge roller, 225 is a discharge switching roller, and 226 is an image tip position detection sensor. Also element 227 is an external inlet port for carrying in recording paper from an optional device. It should be noted that the developing unit 208, is an assembly of developing units incorporating a cyan developing unit 208C, magenta developing unit 208M, a yellow developing unit 208Y, and black developing unit 208K therein. Element 100S is a line for transferring data from the scanner module 100 to the printer module 200. Also element 500 shown by a dotted line is an optional sorter, which may be attached by the user.

Figure 9:
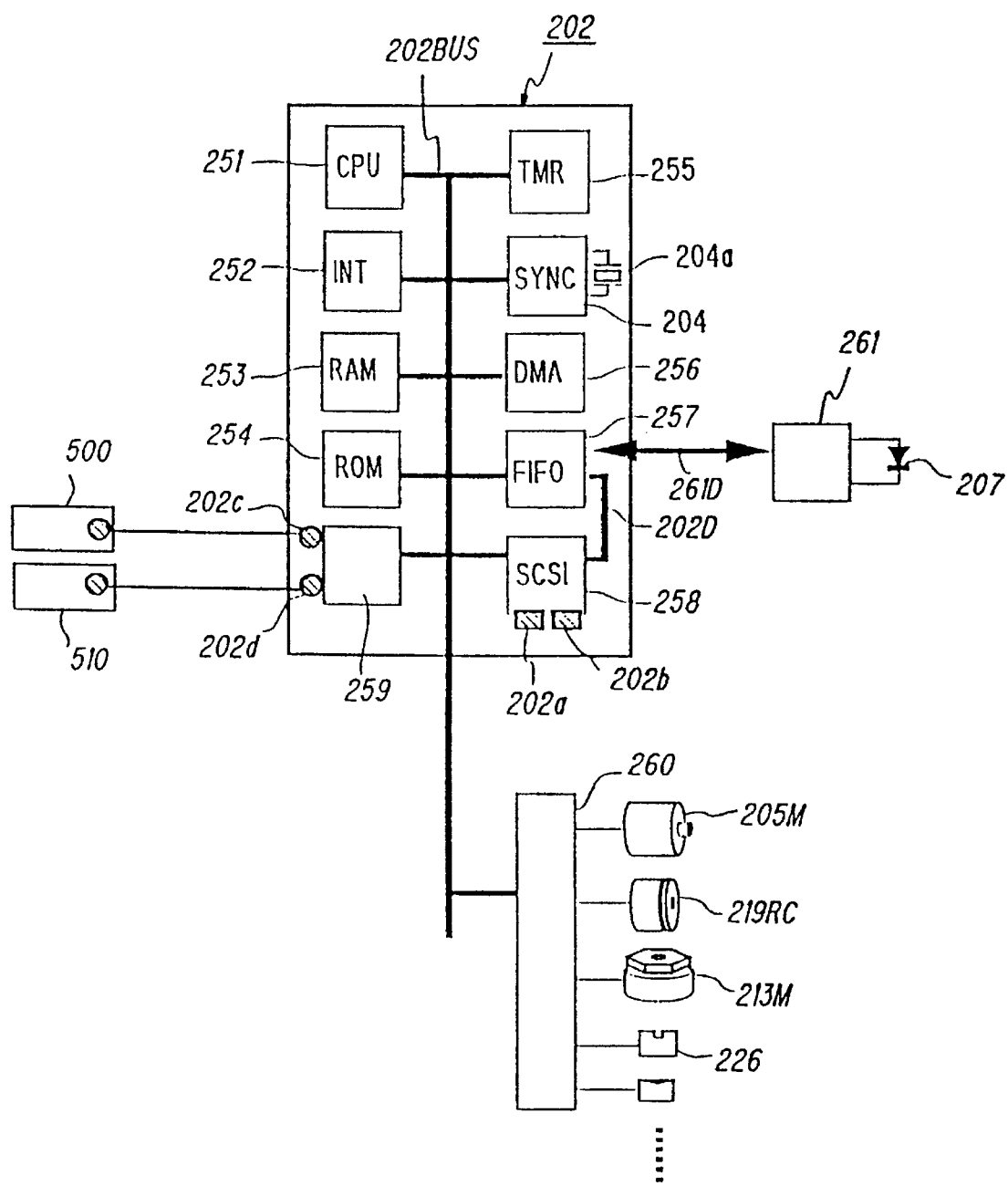
FIG. 9 is a block diagram illustrating components of a second data I/O section.

FIG. 9 is a block diagram of the second data I/O section 202 which controls communications with other modules. In this figure, element 251 is a microprocessor (CPU), 252 is an interrupt controller (INT), 253 is a read/write memory (RAM), 254 is a read only memory (ROM), 255 is a timer counter (TMR), 256 is a DMA controller, 257 is a first-in first-out memory (FIFO), 258 is an SCSI controller, 259 is a controller for optical fiber connectors 202c and 202d, 204a is a crystal oscillator for the second synchronizing signal generating section 204, 202BUS is a data bus, and 261D is an image data channel. Element 260 is an I/O circuit for components such as a sensor and a motor, while 261 is a driving circuit for the laser diode 207 (laser exposure unit). Both of these two circuits are connected to the bus 202BUS in the second data I/O section 202.

Also in this figure, elements 500 and 510 are a sorter and a multi-stage paper feeder connected to element 202 via the optical fiber connectors 202c and 202d.

The printer module 200 forms a full color visual image comprising of dot patterns having a recording dot density of $1/16$ mm or $1/24$ mm based on 2-dot recording data having a pixel density of $1/16$ mm or $1/24$ mm both in the primary and secondary scanning directions for each of the CMYK colors inputted to the second data I/O section 202, and outputs the visual image on recording paper. Selection of the recording dot density of $1/16$ mm or $1/24$ mm is executed according to a mode select command. The default dot density is $1/16$ mm.

When an image forming cycle is started, the photosensitive drum 205 is first rotated counterclockwise by the driving motor 205M, and the intermediate transfer belt 210 is rotated clockwise. Formation of a $\underline{C}$ toner image, M toner image, $\underline{Y}$ toner image, and $\underline{K}$ toner image is executed successively in accordance with rotation of the intermediate transfer belt 210. Finally, the images are superimposed in the order of CMYK on the intermediate belt 210 to form a toner image.

A $\underline{C}$ toner image is formed when the electrifying scorotron 206 electrifies the photo-sensitive drum 205 homogeneously with a negative voltage of −700 V by means of corona electric discharge. Then the laser diode 207 executes laster exposure according to a $\underline{C}$ signal. Record signals for forming an image are provided from the scanner module 100 in the general copying mode, and from the system control module 300 in a specific copying mode such as an intelligent image processing mode (AI processing mode described later), a facsimile mode or a printer mode. A data request signal REQ requests transfer of recorded image data in a specified time from the scanner module 100 in the copying mode or from the system control module 300 in the facsimile mode and the printer mode.

A record signal is input from the SCSI connectors 202a and 202b in the second data I/O section 202, and the laser driving circuit 261 is a record control circuit which controls the laser diode 207 for light emission according to an input pixel. A record signal consists of two bits for one pixel. More specifically, a laser beam is emitted for the full primary scanning line width for a pixel having the highest $\underline{C}$ density, no laser beam is emitted for a white pixel, and a laser beam is emitted for a period of time proportional to the density of a signal of intermediate density.

When a laster image is exposed to laser beam light as described above, in the exposed section of the light sensing drum body 205 which is homogeneously electrified in the initial stage, an electric charge disappears in proportion to the quantity of light to which the section was exposed, and an electrostatic latent image is thus formed.

In the developing unit 203 toner is electrified to a negative polarity when mixed and agitated with a ferrite carrier, and a cyan development roller in developing unit 203 is biased when a voltage level is applied to the metallic base layer of the photo-sensitive drum 205 by a power supply means not shown herein. As a result, the toner does not adhere to a section of the photo-sensitive drum 205 where an electric charge is still remaining, while the toner adheres to a section having no electric charge, namely in the section exposed to light, and for this reason a C visual image completely similar to the latent image is formed.

Thus, when a toner image on the light sensing body drum 205 is rotated counterclockwise and reaches a position opposite to the primary transfer corotron 209, the toner image is transferred by means of corona discharge onto the intermediate transfer belt 210 which contacts the light sensing drum 205 and is driven at the same speed as that of the photo-sensitive drum. A small quantity of residual toner not transferred and remaining on the photo-sensitive drum 205 is cleaned by the cleaning unit 220. The recovered toner is stored in a waste toner tank through a recovery pipe.

The intermediate transfer belt 210 is made of material having a relatively specific resistance value so as to maintain the image characteristics for a long time in the printer mode. This feature makes it possible for a toner image to be maintained for a long time, for example, the image may be maintained for 20 minutes until formation of next M toner image.

Prior to exposure of a laster image for forming an M image based on an M signal, the developing unit 208 is rotated counterclockwise, and the magenta developing unit 208M is moved so that the developing unit 208M will face the photosensitive drum 205. Then a tip position of the C visual image formed before is detected by the tip detection sensor 226, and the data request signal REQ requests transfer of recorded M image data in a specified time from the scanner module 100 in the copying model or from the system control module 300 in the facsimile mode and the printer mode. The request signal is issued when the tip detection sensor 226 detects a C toner mark image for registration which is provided ahead of the effective C image in the previous process. A system in which a permanent mark is put in place of the C toner mark on the intermediate transfer belt 210 is also possible.

If an M signal is received in precise synchronism to the request signal, exposure of an M image, development, and primary transfer are executed, and also accurate color print section alignment with the original C image is achieved, namely, the M image is correctly superimposed on the C image on the intermediate transfer belt 210.

Thus when an M laster image is exposed to light, electric charge in proportion to a quantity of light to which the M laster image was exposed disappears in the exposed section of the photo-sensitive drum homogeneously electrified in the initial state, and an electrostatic latent image is formed.

M toner in the developing unit 208M is electrified to a negative polarity, and the magenta development roller in developing unit 208M contacts the light sensing drum body 205 which is biased to a voltage similar to that in the C developing unit. As a result, the toner does not adhere to a section of the photo-sensitive drum 205 where electric charge is remaining, while M toner adheres to a section exposed to light according to the M signal, and an M visual image similar to the electrostatic latent image is formed.

Similarly, a Y image and a K image are superimposed on the CM toner image and the CMY toner image respectively. It should be noted that the basic image processing section 105 executes the UCR (under color removal) processing and for this reason one pixel is rarely developed with all of the four colors. A full-color image formed on the intermediate transfer belt 210 which was rotated at least four times as described above is rotated and transferred to a position on the secondary transfer corotron 211.

When formation of an image is started, record paper is fed from any of the three paper feeding sections, namely the double-sided copy paper auto-feeder cassette 215, the manual paper feed tray 216, and the external paper feed port 227, to the resist roller pair 219. The resist roller pair is driven so that a tip of the recording paper coincides with a tip of the image on the intermediate transfer belt 210 passing by the secondary transfer corotron 211. Registration alignment between the recording paper and the image is thus carried out.

The recording paper aligned with the image on the intermediate belt 210 passes under the secondary transfer corotron 211 which is connected to a positive voltage power supply unit. The recording paper is electrified to a positive electric charge by the corona discharge current, and most of the toner image is transferred to the recording paper. When the recording paper passes over the charge removing core (not shown) provided on the left side of the secondary corotron 211 and connected to an earthing source, the recording paper discharges the electric charge, and most of the absorbing force between the intermediate transfer belt and the recording paper disappears. When the tare weight of recording paper becomes larger than the absorbing force, the recording paper is transferred from intermediate transfer belt 210 to the transfer belt 221.

The recording paper with a toner image thereon is transferred by the transfer belt 221 to a fixing position which includes the fixing roller 222 and the fixing back-up roller 223. Then heat and pressure are applied to the recording paper between the heated fixing roller 222 and the fixing back-up roller causing the toner to melt down into fibers of the recording paper, thus fixing the image. Namely, a copy image is completed. The complete copy image passes through the paper discharge roller 224 and is sent out of the copying system. The discharged paper is stacked on a tray not shown herein with the copied surface facing upward.

When images are to be copied on both surfaces of the recording paper, the switch roller 225 is moved together with a paper deflector and is pressed to the opposite transfer roller to turn over the recording paper once, and then the recording paper is led to the double-sided copy paper auto-feed cassette by the transfer roller 215H. Then the copied recording paper is stacked on the tray with the copied surface upward.

The second data I/O section 202 communicates with the system control module 300 or the scanner module 100 according to a specified protocol, obtains image data basically by a main scanning line, forms an image by coordinating, energizing and controlling all of the devices inside the module according to the selected print mode, and outputs the final image onto the recording paper. Also, the developing unit 208 controls optional devices, such as a sorter, which may be added to the printer module 200.

In the color print mode, C, M, Y and K color images are formed one by one, the images are superimposed on the intermediate transfer belt 210, and the resultant image is transferred as a final image onto the recording paper. For this reason, in the color copy mode, a scan request is issued four times (once for each C, M, Y and K signal) to the system control module 300 or the scanner module 100. When forming a color image, it is very important to insure positional accuracy (correct registration) for each color print section on the intermediate transfer belt, and the system according to the present embodiment shown in FIG. 10 achieves this objective.

Figure 10:
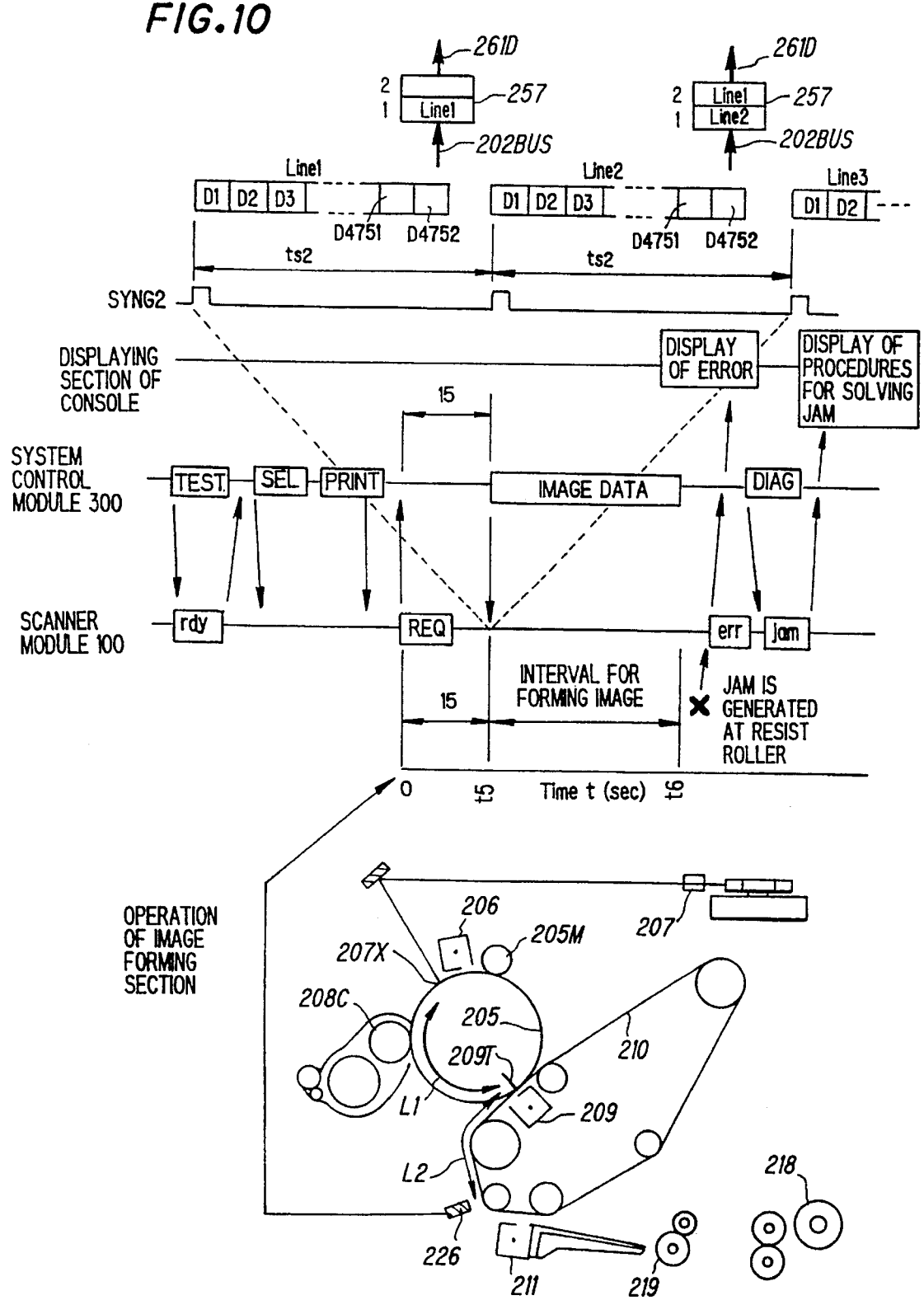
FIG. 10 is a timing diagram illustrating an example of timing control for the printer module.

FIG. 10 is a timing diagram for the printer module 200, which illustrates synchronization of the color image signals. In the system shown in FIG. 10, a data request command REQ is sent to the system control module 300 or the scanner module 100 at a specified time t5 before reception of the image data. When forming a color image, in the second or subsequent color print sections, the data request signal REQ may be issued at a time t5 before the tip of the previous color image reaches the exposure point 207X. In order to accurately measure the time required for a tip of the previous color print section to reach the exposure point 207X, the image tip detection sensor 226 is provided at a position opposite to the intermediate transfer belt 210. Basically a value obtained by adding a product of the photo-sensitive body's circumferential speed Vpc with t5 to the range L1 from the exposure point 207X to the primary transfer point 209T is coincided with the range L2 from the primary transfer point 209T to a detecting position of the image tip detection sensor 226. In forming the second and subsequent color print sections, the tip reference image of the color image formed in the previous step is detected, and a data request signal REQ is issued simultaneously when the tip reference image is detected.

This type of system in which a data request signal is issued at a specified time, is especially useful for a data source having a data receiving side with a scanning device requiring a delay, such as the scanner module 100 which requires a certain period of time for preparation until start of an image data output.

By issuing the data request command as described above, the data generating side is always ready to send data for the first scanning line at time t5 according to the inter-module protocol and thus it is possible to maintain phase synchronization.

Next, to establish cycle synchronization, in the copying system according to the present embodiment of the present invention, the record data for one scanning line is received from the data sending side in synchronism to the pulse cycle ts2 of pulse series generated by the second synchronizing signal generating section 204, and the received data is input in the FIFO 257 which is a receiving buffer. Also the rotary multi-faced mirror is driven in synchronism to pulse series cycle ts2. Specifically, the rotary multi-faced mirror 213 is driven by a phase lock servo and the mirror face changes at a ts2 cycle. As a result, the exposure point 207X of the laser diode 207 emits light and scans the photo-sensitive drum 205 at a ts2 cycle also. In addition, during light emission and scanning, the laser driving circuit 261 drives and turns ON the laser diode 207 4752 times for each pixel according to the image data D1 to D4752 (Refer to FIG. 10). In the copy mode, the data sending side is the scanner module 100, and the synchronizing mechanism described above is maintained. For this reason, even if a manuscript is scanned many times, image data is obtained in a constant period of time after the command is sent, a correct positional relation (registration) between recording paper and an image and correct registration of color print sections are maintained.

Figure 11:
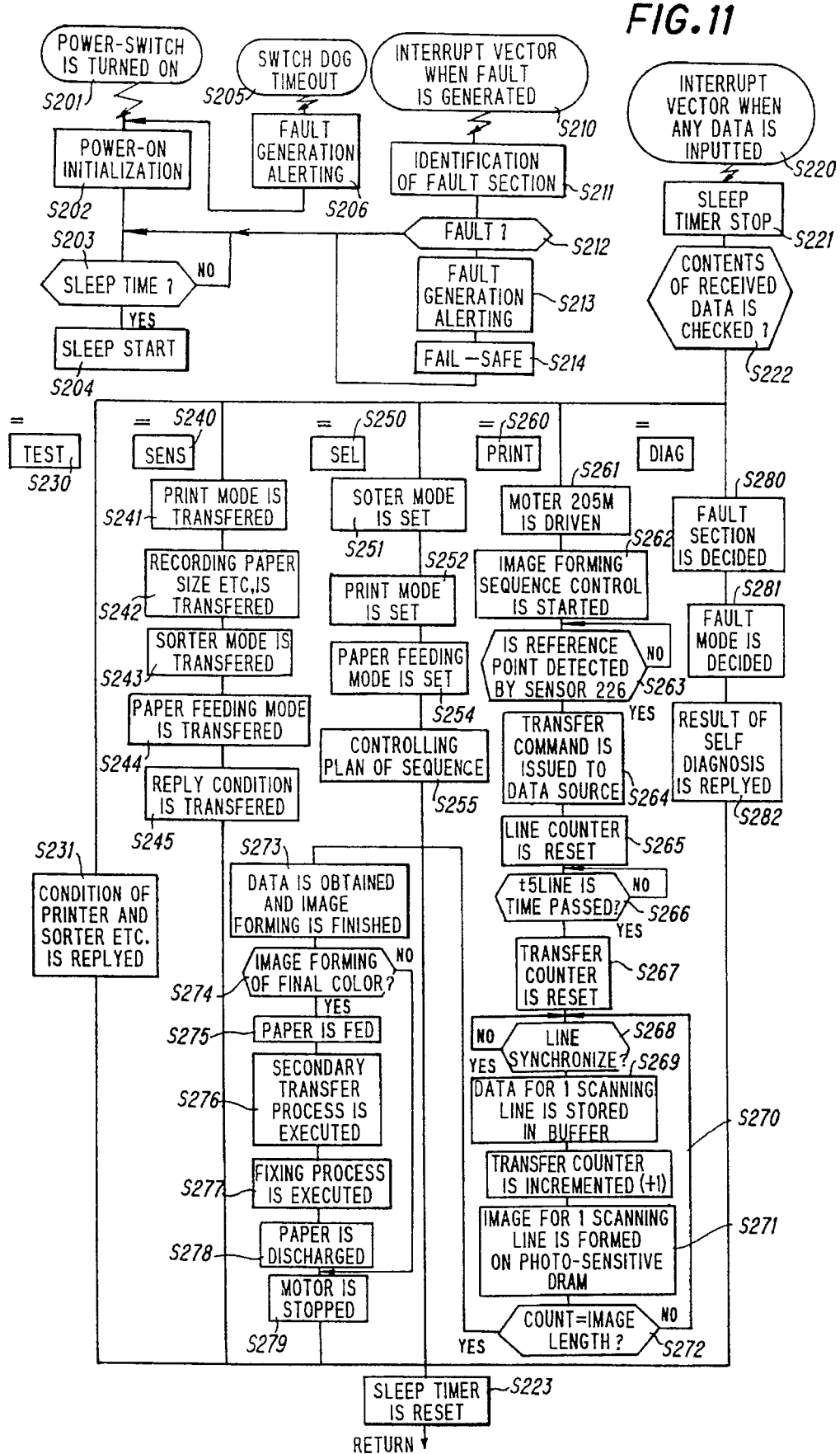
FIG. 11 is a flowchart illustrating functions of the second data I/O section.

FIG. 11 is a flow chart illustrating other functions of the second data I/O section 202. These functions are executed by running a program via microprocessor 251 shown in FIG. 9. The program is stored in the read only memory 254. Step S201 corresponds to turning ON the power switch 203b, while at step S202 initialization including setting initial parameters for various circuit elements, the watch dog timer start, and the initial positioning of 4-color developing unit 208 is performed.

At step S203 a determination is made as to whether or not a command from the SCSI connectors 202a and 202b has come in within a specified period of time (time-out time).

At step S204 power is disconnected from the heater in the fixing unit, which is useful for power reduction in the stand-by mode.

Step S205 indicates that the watch dog timer is off from normal execution of the program, resulting in a fault generation alert being sent to the system control module 300.

Step S210 corresponds to the interrupt vector as a result of a fault generated in the image forming section 201 or in other modules in this system, at step S211 a determination is made as to whether or not a fault has occurred the identity of the faulty section and the cause of the fault, at S213 the system control module 300 is alerted that a fault has occurred, and at step S214 fail-safe processing is executed for evading such events as fire, for instance, due to overheating of the motor 205M.

Step S220 corresponds to interrupt vectoring when any data is input to the SCSI connectors 202a and 202b. Operation of the sleep timer is stopped in step S221. At step S222 the contents of received data is checked and a branch to other types of operation occurs.

During the TEST (TEST unit ready operation) at step S230, the printer module inquires whether or not formation of an image is possible, and a reply concerning status of the scanner module 100 including optional devices 500 and 510 is given at step S231.

During the SENS operation (mode SENSE) at step S240 an inquiry is made as to the various types of modes set up in the printer module 200, and replies concerning the set-up mode in the printer module 200 including optional devices 500 and 510 are given in at steps S241 to S245.

During the SEL operation (mode SELect) at step S250a request concerning the various types of modes to be set up is made, and this operation is paired with the SENS operation. Various parameters are set up in steps S251 to S256.

Step S260 corresponds in operation for issuing the PRINT request, this request being issued once for each print in ordinary monochrome image forming process, four times in color processing, and two times in secondary color monochrome processing. When issuing this request, at first the motor 205M is activated at step S261, then an image formation sequence control is started at step S262, and detection by the tip detection sensor 226 is monitored at step S263. When the sensor 226 detects a tip of an image, a data request signal REQ is immediately issued. Also, the line counter (scanning line counter) provided in the memory 253 is reset at S265. This counter is incremented by one in response to a synchronizing pulse from the second synchronizing signal generating section 204 generated once per scanning line.

At step S266 a time since a data request signal REQ is issued is monitored until the data sensing side is ready for transmitting the data in the first line. In other words, a time from when another color image exists until the image rotates and returns to the exposure position 207X is monitored. When this time has passed, the line counter is reset at step S267, and furthermore an output enable gate of the FIFO 257, which is a buffer memory for image data, is enabled so as to transfer a record image signal through the image signal line 261D to the laser driver 261.

At steps S268 to S272 one scan line of image data sent from the SCSI connectors 202a and 202b is stored in the FIFO 257, and a synchronizing pulse which the second synchronizing signal generating section 204 generates once per scanning line is detected at step S268. At step S269 record image data for 4752 pixels per scanning line is stored in the FIFO 257. Then the line counter is incremented at step S270.

The loop at step S271 corresponds to the size of the record image data, and for instance scanning is repeated 6720 times (6720 scanning lines) in the case of A3 size paper. When scanning with a laser for one page is finished, the output enable gate of the FIFO 257 is disabled at step S273, and a laser drive signal is disconnected. The transfer of record image data from the SCSI connectors 202a and 202b is completed at this point.

At step S274 a check is made as to whether or not the last operation of forming an image for the final color is completed. If the image being formed is not the final color image the motor is stopped at step S279. If formation of the final color image is complete, the processes of paper feeding, secondary transfer, fixing and paper discharging occurs at steps S274 to S278, and the record image (recording paper) is discharged from printer module 200.

Step S290 corresponds to an operation of self diagnosis DIAG (DIAGnostic) when required by the printer module 200. Self diagnosis is typically required after the fault generation alert function at steps S206 and S212 indicates a fault, and the self diagnosis and reply to the request are executed at steps S291 to S293.

Figure 12:
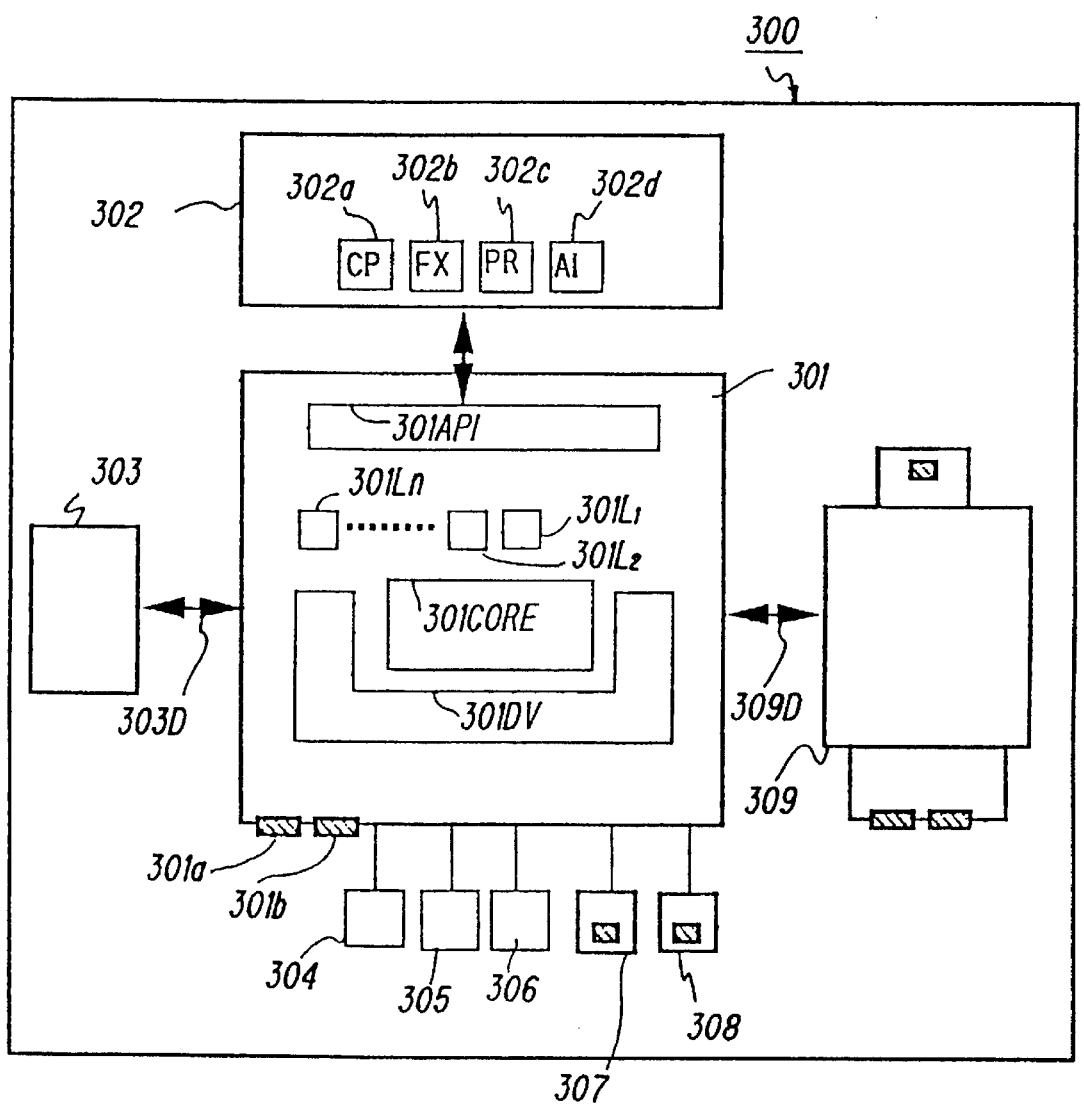
FIG. 12 is a diagram illustrating basic functional sections of a system control module.

FIG. 12 is a block diagram illustrating basic functional sections of the system control module 300. FIG. 13 is diagram of the system control module 300. The system control module 300 is largely divided into the third data I/O section 301 having SCSI connectors 310a and 301b and which is an I/O interface for image data as well as for various types of control data, a system control section 302 which issues a command to run the scanner module 100 and the printer module 200 synchronously, a console 303 having a key input section 303a and a bit map display section 303b, an electrophoto-magnetic memory or a CD-ROM drive unit 304, a floppy disk device 305, an IC card drive unit 306, an interface 307 for connection to a host computer or other components, an interface 308 for connection to the public network, and an accelerating device 309. It should be noted that the system control section 302 comprises of a copy processing section 302a, a facsimile processing section 302b, a print processing section 302c, and an intelligent image processing section 302d.

All of the above functional sections are packaged in the system control module 300. System control module 300 may be connected to the upper section of the printer module 200 with a connecting means.

As shown in FIG. 13, an operating panel of the console 303 is exposed upward and is provided in the front side so that the console can be operated when the scanner module 100 is placed on top of it. Also the electrophoto-magnetic memory or the CD-ROM drive unit 304, a floppy disk device 305, and the IC card drive unit 306, and SCSI connectors 301a and 301b of the third data I/O section 301 are provided. It should be noted that recording medium driving device such as the electrophoto-magnetic device or the CD-ROM drive unit 304, the floppy disk device 305, and the IC card drive unit 306 are optional according to the desired system configuration.

Figure 14:
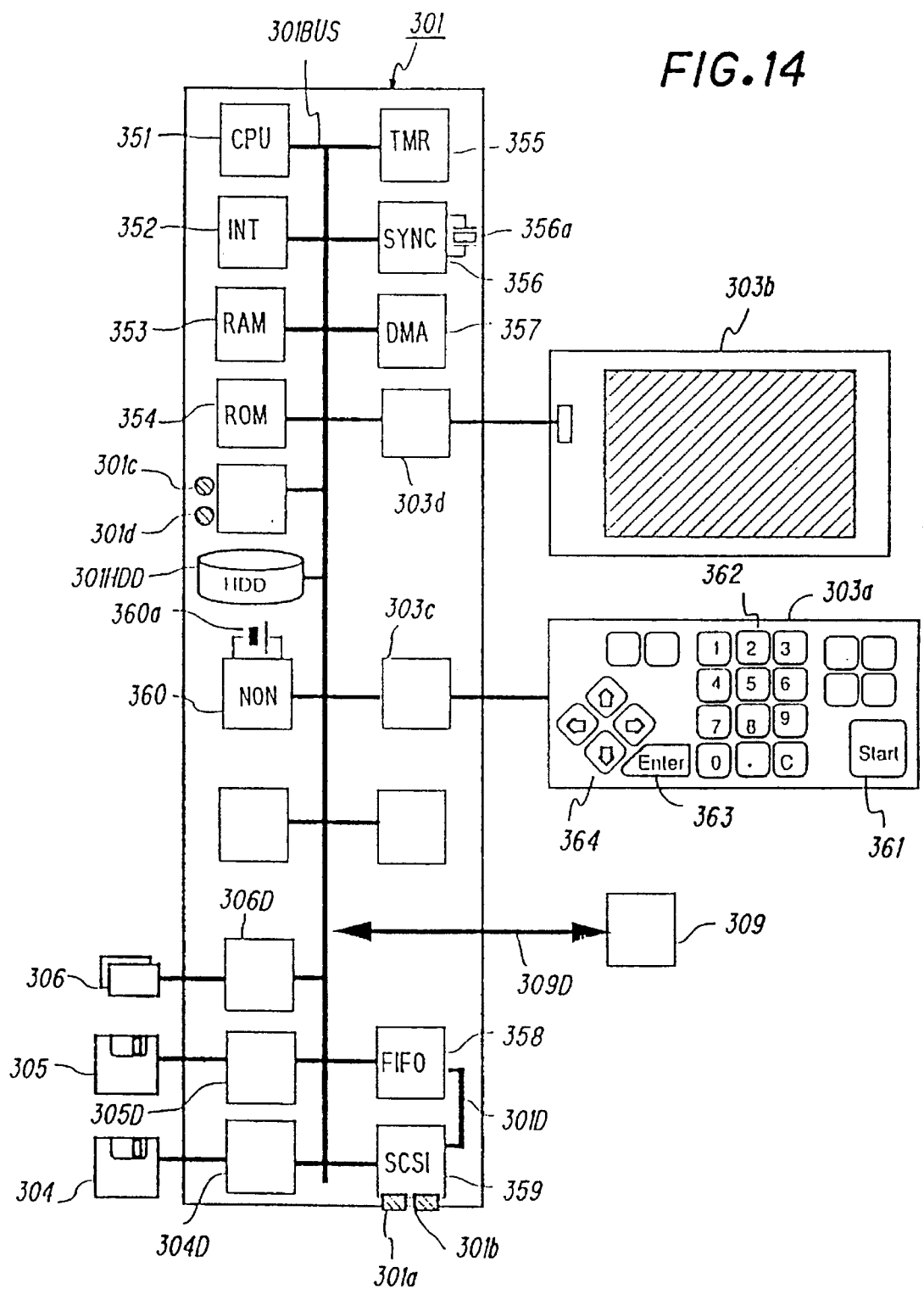
FIG. 14 is a block diagram illustrating components of a third data I/O section.

FIG. 14 is a block diagram illustrating components of the third data I/O section 301. In this figure, element 351 is a microprocessor (CPU), 352 is an interrupt controller (INT), 353 is a read/write memory (RAM), 354 is a read only memory (ROM), 355 is a timer counter (TMR), 356 is a third synchronizing signal generating section, 356a is a crystal oscillator of the third synchronizing signal generating section 356, 357 is a DMA controller, 358 is a first-in first-out (FIFO) memory, 359 is an SCSI controller, 301a and 310b are SCSI connector, 301c and 301d are optical fiber connectors, 301BUS is a data bus, and 301D and 309D are image data channels.

Also element 360 is a memory backed up by a battery 360a, 310HDD is a magnetic disk drive, 304D, 305D and 306D are controllers for an electrophoto-magnetic device or a CD-ROM drive unit 304, a floppy disk unit 305, and an ID card drive unit 306 respectively.

In addition, elements 303c and 303d are an interface for the key input section 303a and the bit map display section 303d respectively. In the key input section 303a components such as a start key 361, a ten-key 362, an enter key 363, and a cursor key 364 are provided.

The first function of the third data I/O section 301 is to provide control over either or both the scanner module 100 and the printer module 200. The second function is to provide control over the console for image displaying. The third function is to operate a recording medium such as the electrophoto-magnetic memory or CD-ROM drive unit 304, a floppy disk unit 305, and IC card drive unit 306.

In FIG. 12, the third data I/O section 301 includes an operating system 301CORE, a library routine 301L1–Ln, an application processing interface 310API, and a device driver 301DV. All of these functions and means make use of hardware resources in the third data I/O section 301, and are realized by means of executing a program stored in the ROM 354 or the magnetic disk drive 301HDD.

The first function of the device driver 301DV is to control up to seven modules of the scanner module 100 and/or printer module 200. The second function is to control the console 303 for display to a screen (display section 303b) and input from the key input section 303a. The third function is to operate a recording medium such as the electrophoto-magnetic memory or CD-ROM drive unit 304, the floppy disk unit 305, or the IC card drive unit 306. These control processes are activated under multi-task real time control by the operating system 301CORE.

The application processing interface 301API is an interface means with the system control section 302. The system control section 302 is key for utilization of the third data I/O section 301 as well as means and devices connected thereto.

In FIG. 12, the system control section 302 includes the copy processing section 302a, the facsimile processing section 302b, the print processing section 302c, and the intelligent image processing section 302d. All of these processing sections share hardware resources of the third data I/O section 301, and are realized by means of executing a program stored in the magnetic disk drive 301HDD.

The copy processing section 302a is a processing means for realizing an image copying function by providing systematic controls over the entire system in which the scanner module 100, printer module 200, and the system control module 300 are connected.

The facsimile processing section 302b is a processing means for realizing a facsimile function by providing systematic controls over the entire system in which the scanner module 100, the printer module 200, and the system control module 300 are connected.

The print processing section 302c is a processing means for realizing a printer function by means of providing systematic controls over the entire system in which the scanner module 100, the printer module 200, and the system control module 300 are connected to each other.

The intelligent image processing section 302d is a processing means for realizing an intelligent image processing function by providing systematic controls over the entire system in which the scanner module 100, the printer module 200, and the system control module 300 are connected to each other. Intelligent image processing is defined as image processing in which a manuscript picture and the output image are quite different, for example, when the scanner module 100 recognizes letters from a read image and makes up graphics based on the letters. In the intelligent image processing, which is different from processing in the general copying mode, image data is fetched into the system control section 302, the image data is processed by the intelligent image processing section 302d, then the processed image data is sent to the printer module 200, and an image is formed.

The above types of application processing are selected according to the system configuration and are incorporated in the system control module 300.

Figure 17:
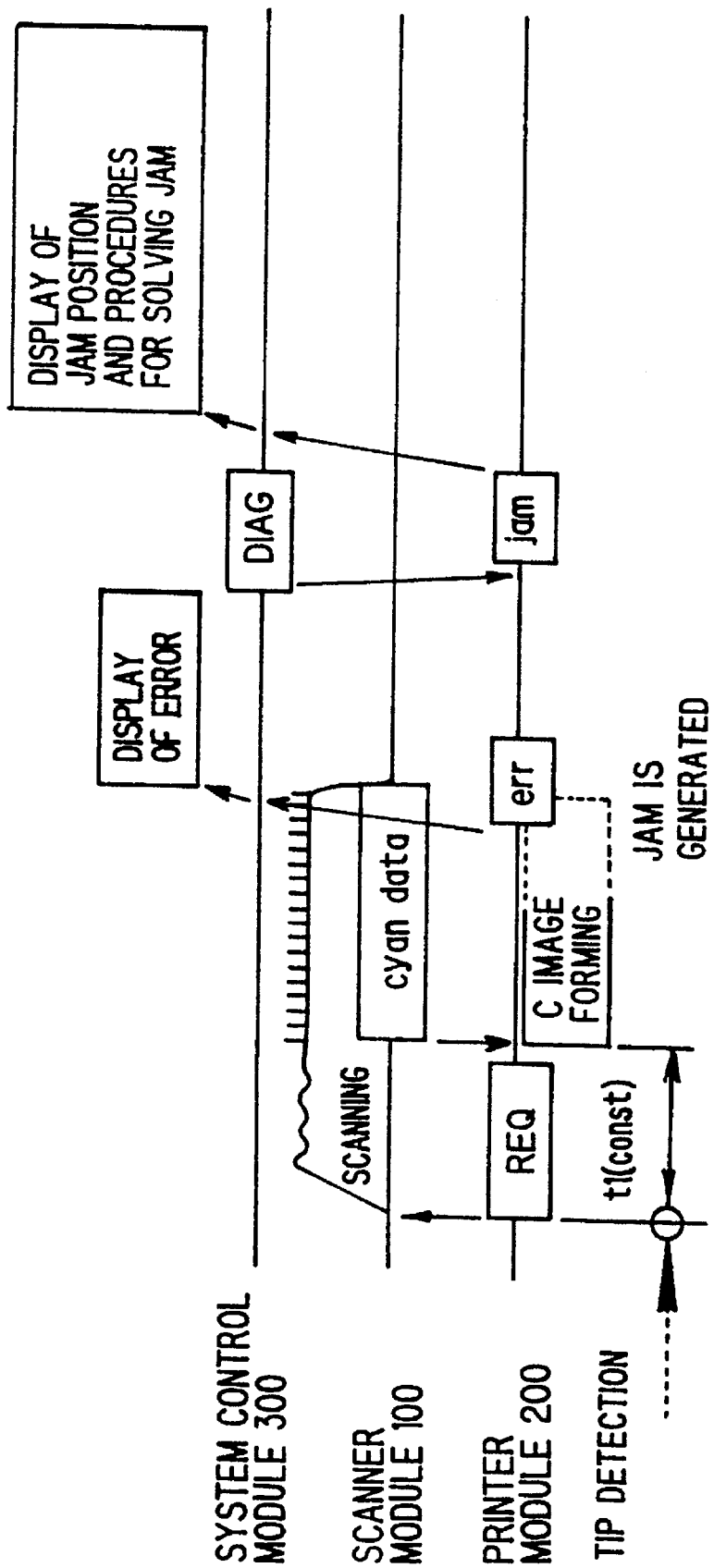
FIG. 17 is a timing diagram illustrating a case when a fault occurs during a copying operation.

Next, a system in which the copy processing section 302a in the system control section 302 for realizing a copying function in which the scanner module 100, the printer module 200, and this system control module 300 are connected to each other is described. FIGS. 16A and 16B are timing diagrams illustrating operations during a copying function, while FIG. 17 is a timing diagram when a fault is generated during the copy processing function.

Figure 15:
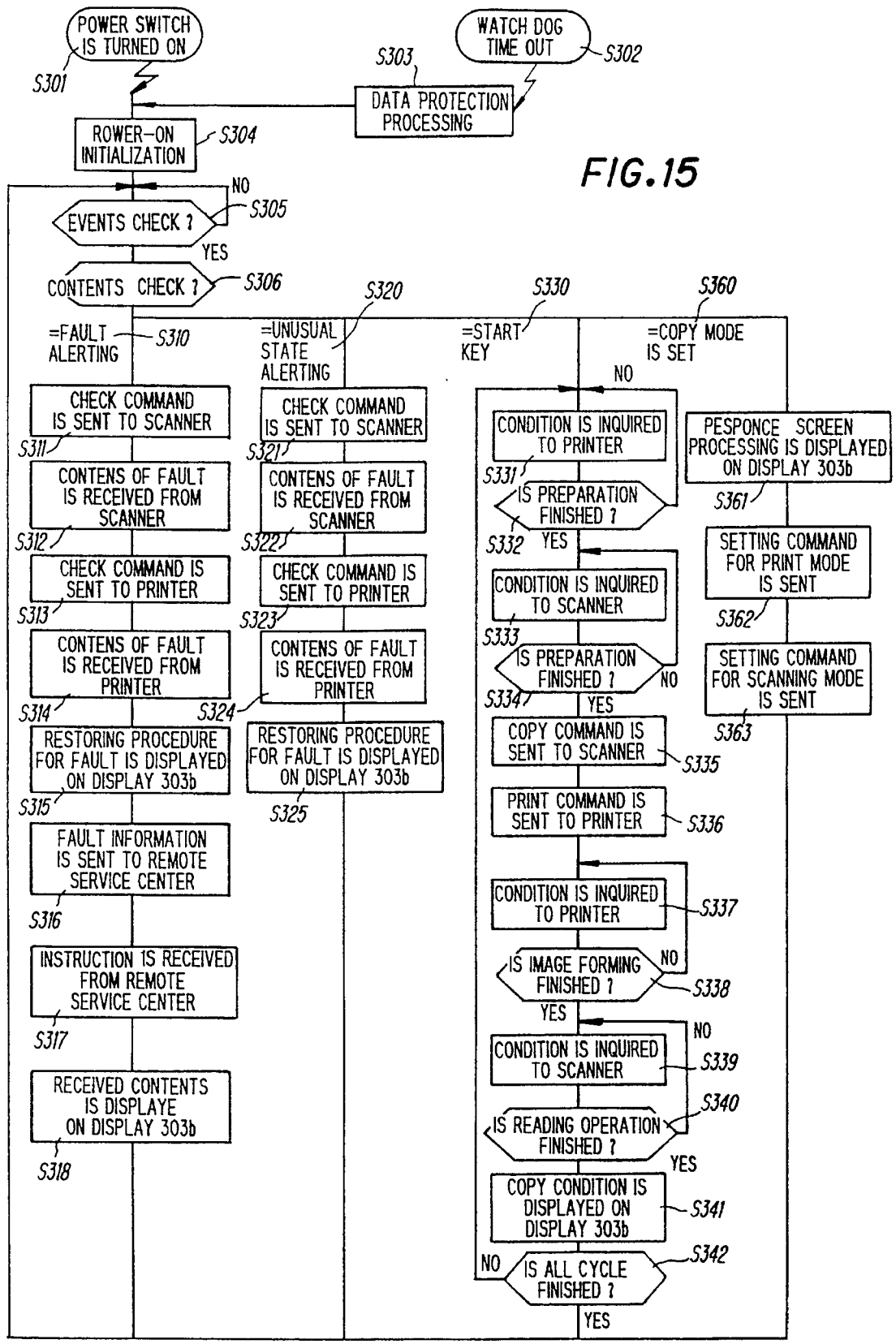
FIG. 15 is a flowchart illustrating functions of a copying process section in a system control section for achieving the copying function.

In FIG. 15, step S301 corresponds to the power switch 203b of the printer module 200 being turned ON. Herein turning ON power at the printer module 200 is referred to, because the system control module 300 is integrated with the printer module 200 and an electric power is supplied thereto from the printer module 200. At step S304, power-on initialize processing including initialization of parameters on various types of software, for instance, an internal register in the interrupt controller 352 occurs.

Step S302 corresponds to a time out of the watch dog timer, and at step S303 processing to back-up data is executed. Specifically, data is saved in the memory 360 which is backed up by a battery, and the system operation branches to the power ON initialize processing at step S304. At step S305 a process to check for various events is executed, while at step S306 a process to check contents and a jump to other operations is executed.

At step S310 a branch occurs when an alert due to a generation of a fault is received from the scanner module 100 or the printer module 200, and the contents of the received faults are checked at steps S311 to S314. At step S315 the fault is displayed on a screen (display section 330b) so that contents of the fault are clearly shown to an operator. Also the above information is sent to a service center via the public line. At step S317 instruction such as a sequence for overcoming the fault is received from the service center, and contents of the received information are displayed at step S318.

At step S320 a branch occurs when an alert due to a generation of a fault is received from the scanner module 100 or the printer module 200. The fault defined herein indicates, for instance, a shortage of toner or recording paper, or an open door of a frame. The faults as described above can be cleared, for instance, by adding toner or closing the door.

At step S330 a branch occurs when the start key 361 is pressed, and at steps S331 and S333 an inquiry is made as to whether or not the scanner module 100 and the printer module 200 are ready. If both components are ready, the COPY command is sent to the scanner module 100 at step S335, and the PRINT command is sent to the printer module 200 at step S336. As a result, commands are exchanged between the scanner module 100 and the printer module 200, image data is exchanged according to the sequence described in relation to each module, and a copy is produced.

In steps S337 to S340, an inquiry is made as to whether or not a series of image read process and image forming process have been finished. If an initial state has been restored, the state of copy is displayed on a screen (Display section 303b). At step S342, a check is made as to whether or not copying by the specified color print sections or a specified number of copies is complete, and if formation of remaining color images is not completed, the system control returns to the first step (S331). In copying a color image, this loop is repeated four times.

Step S360 is activated when various types of copy modes are entered by an operator from the console 303. For example, when an image processing mode or a sorting mode is specified, a response screen is displayed on the display section 303b at step S361, and at the same the time a mode set command is sent to the scanner module 110 and the printer module 200 at steps S363 to S363.

FIG. 18 and FIG. 19 are diagrams illustrating various system configurations in which the above-described basic modules are combined. Each example shows a case in which a system useful for various purposes is formed. In FIG. 18 and FIG. 19, a square indicates a functional block, an arrow indicates an image signal, and solid lines 100S and 200S represent a transfer line for transfer of control signals and image signals between the modules (namely an SCSI cable).

Figure 18A:
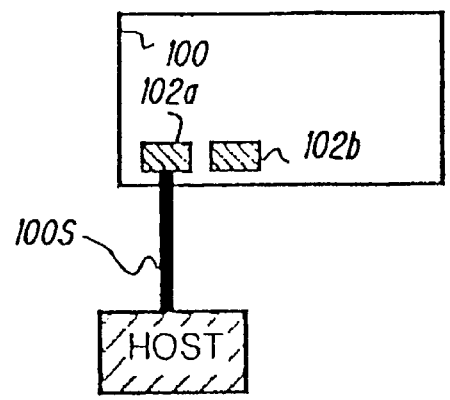
FIGS. 18A, 18B and 18C are block diagrams illustrating examples of system configurations in which three types of basic modules are assembled.

FIG. 18A is a diagram of the scanner device comprising of the scanner module 100, in which the SCSI connector 102a (or 102b) of the first data I/O section 102 is used to connect to a host computer HOST. The first data I/O section 102 directly communicates with the host computer HOST to deliver read image data.

Figure 18B:
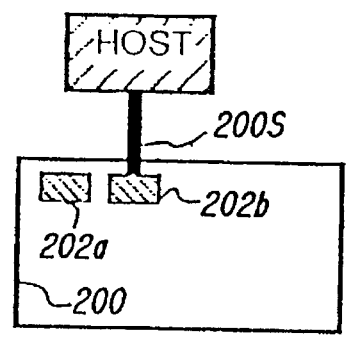

FIG. 18B is a diagram of the bit-map laser printer comprising the printer module 200 as a single body. The SCSI connector 202b (or 102b) of the second data I/O section 202 directly communicates with the host computer HOST to obtain image data from the host computer to form a hard copy.

Figure 18C:
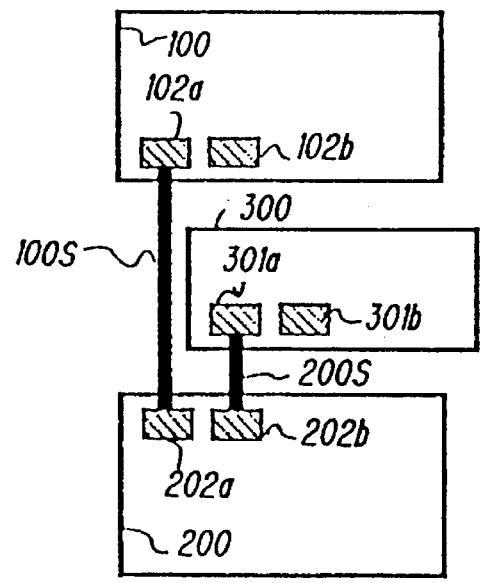

FIG. 18C is a diagram of the system configured as a general copying machine. This system configuration can be realized by connecting a scanner module 100, a printer module 200, and a system control module 300 to each other. In the above configuration, control module 300 which incorporates the copy processing section 302a controls the scanner module 100 and the printer module 200 to realize a copying function.

Figure 19A:
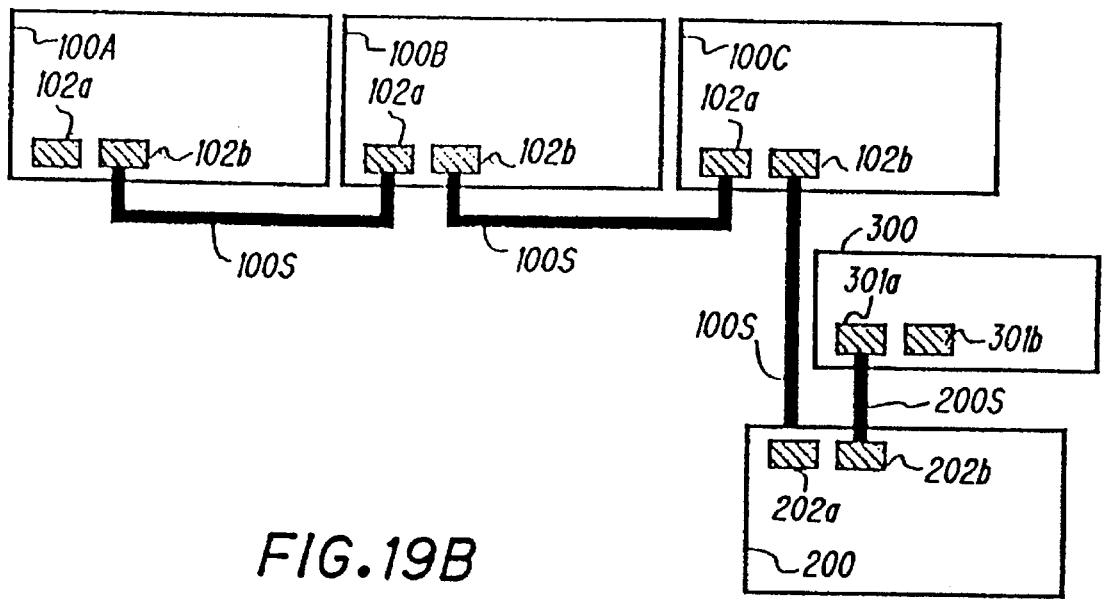
FIGS. 19A and 19B are block diagrams illustrating other examples of system configurations in which three types of basic modules are assembled.

FIG. 19A shows a triple read copying machine, in which each of the copying sections are connected to a first scanner module 100A, a second scanner module 100B, a third scanner module 100c, the printer module 200, and the system control module 300. In the above configuration, the first scanner module 100A may be a general scanner module for handling, for example, A3 recording paper, the second scanner module 100B may be a large size scanner module for handling, for example, A1 recording paper, and the third scanner module 100C may be a color scanner module. The above configuration has various merits as compared to a case where several copying machines are each dedicated to a special size of recording paper as well as to handle color copies. Also, various combinations of system components can freely be interchanged according to necessity. In the above system, control module 300 incorporates a multiple read copy processing section (not shown) for realizing a copying function by controlling the above four modules.

Although not shown herein, a system can comprise of a plurality of printing modules 200. In this case, a multiple record/copy processing section for realizing a copying function by controlling the other modules is incorporated in the system control module 300. Also, in copying system according to the present invention, up to seven units can be connected as a multiple system (i.e., several scanner and printer modules).

Figure 19B:
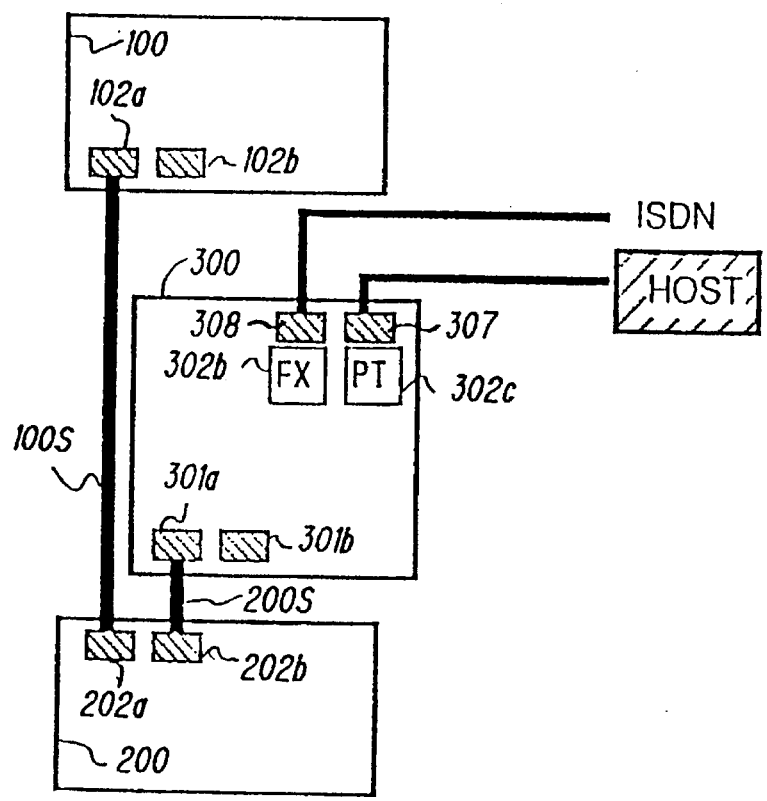

FIG. 19B shows a high performance copier, color printer, and facsimile hybrid system comprising of a scanner module 100, a printer module 200, and a system control module 300. System control module 300 incorporates the interface for connection to the host computer HOST, a printer processing section 302c for converting print data in a page description language format received from the interface 307 to laster data, an interface 308 for connection to the public line ISDN, and a color facsimile processing section 302b for extracting data in a specified compression format received from said interface 308 and compressing image data read by the scanner module 100 in a specified format.

Figure 20:
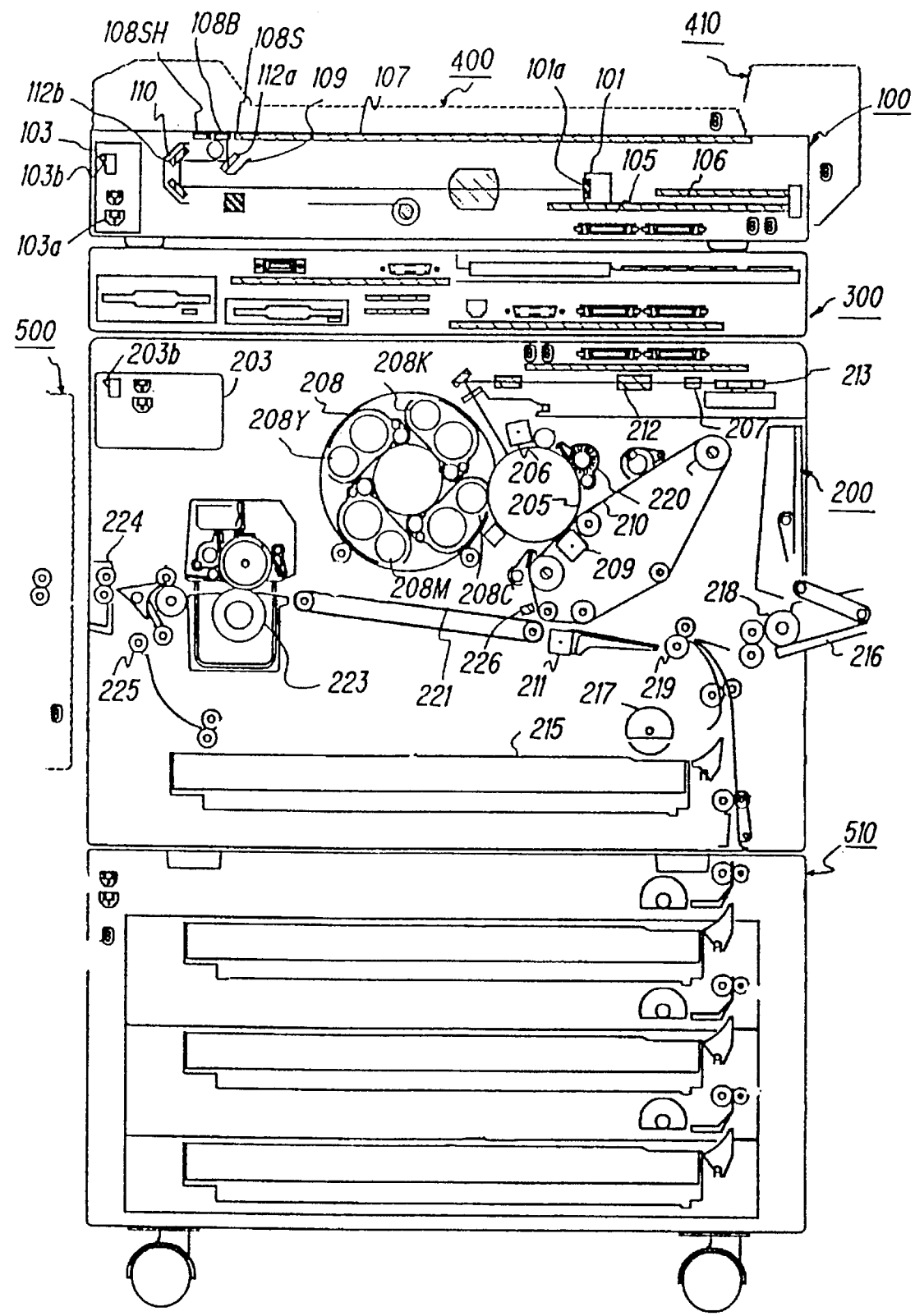
FIG. 20 is a diagram illustrating the system configured as a copying system.
Figure 21:
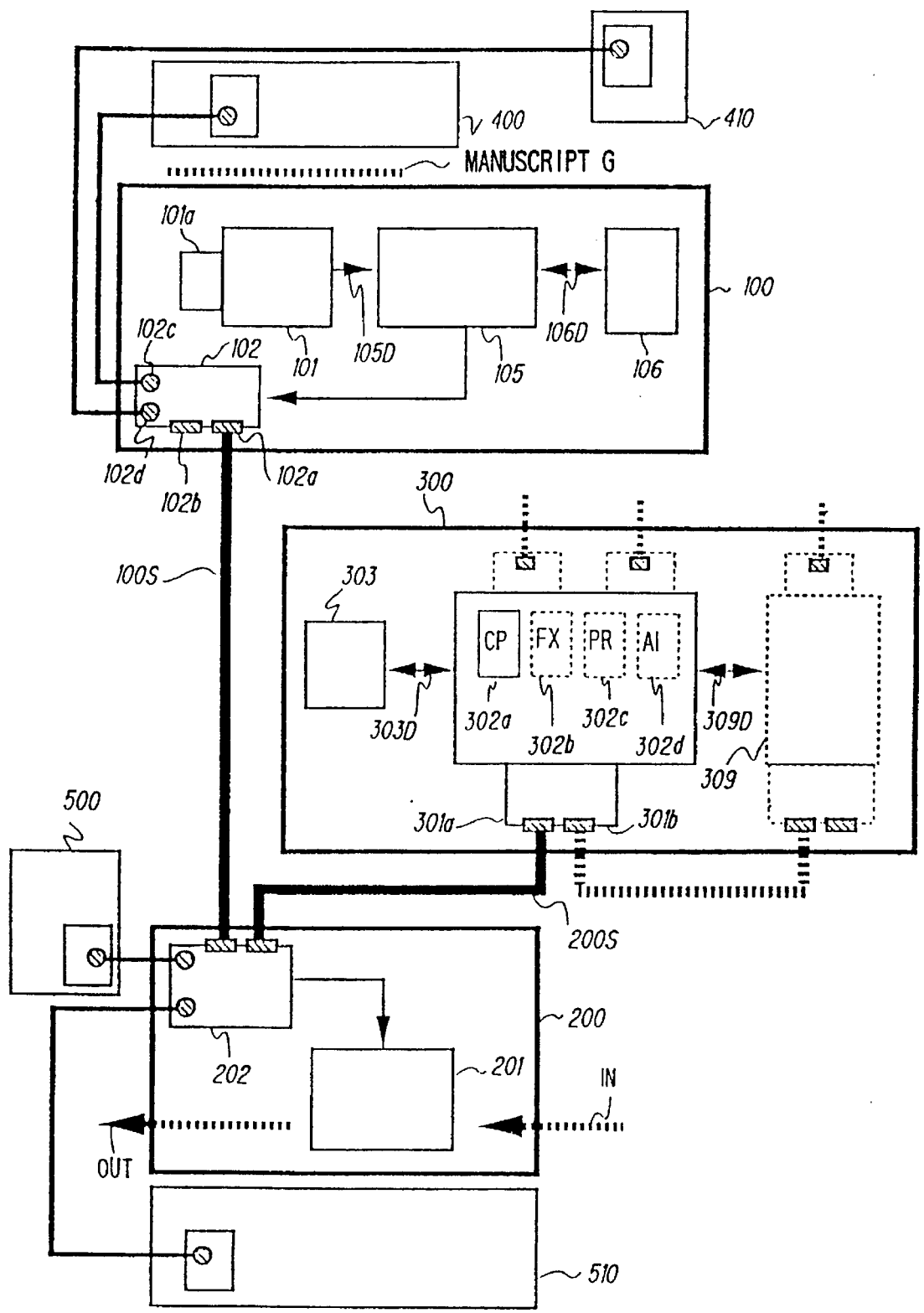
FIG. 21 is a block diagram illustrating functional sections and a signal flow in the copying system shown in FIG. 20.

FIG. 20 is a diagram of a system configuration in which the basic modules are assembled as a copying system. FIG. 21 is a block diagram illustrating the functional sections and signal flow in the example shown in FIG. 20.

This is a more sophisticated example of a system configuration than the copying system shown in FIG. 18C. The system comprises of an automatic manuscript feeder 400 and film projector 410 attached as optional devices to scanner module 100. Also, a multi-stage paper feeder 510 and a sorter 500 are added to the printer module 200.

The sections drawn with a broken line in FIG. 21 are optional functions which can be added to the system control module 300 at a user's site and if all of these operational functions are added, the same copying system as shown in Fig. 19B is obtained.

Figure 22:
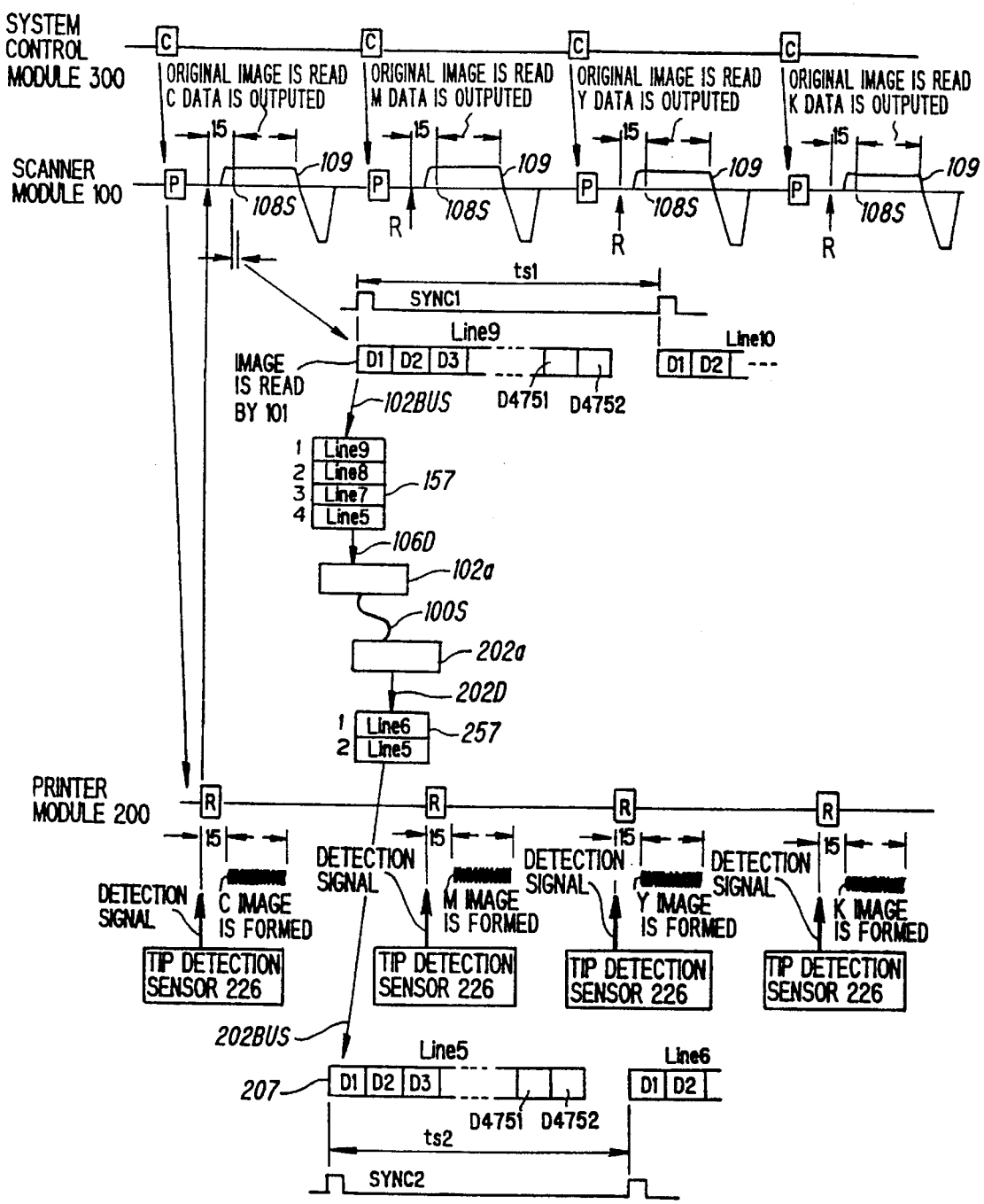
FIG. 22 is a timing diagram illustrating timing for copying a color picture in the copying system shown in FIG. 20.

FIG. 22 is a timing diagram illustrating timing of operation for copying a color image in the copying system shown in FIG. 20. In FIG. 22, the reference numerals 300, 100, and 200 correspond to operations of the system control module, the scanner module, and the printer module respectively. Boxed letters C, R and R correspond to the COPY, PRINT, and REQ signals respectively.

When a first COPY command is issued from the system control module 300 to the scanner module 100, the scanner module 100 transfers the command as a PRINT signal to the printer module 200. When the printer module 200 receives the signal, the image tip detection sensor 226 in the printer module 200 detects an image tip mark drawn on the intermediate transfer belt 210 and immediately the second synchronizing signal generating section 204 sends the result of the detection as a record data request signal REQ to the scanner module 100. At the same time a reset signal activates the line counter which counts until the prespecified time t5. The scanner module 100 having received the data request signal REQ controls acceleration of the first carriage 109 so that the timing is adjusted from the prespecified time t5 up to the start of the manuscript picture reading.

When the time t5 has passed, the first carriage 109 of the scanner module 100 is at the image tip 108S, and the position of the photo-sensitive drum 205 is at 209T, which corresponds to the position where the image tip exposed to light reaches the light axis. Next, the scanner module 100 outputs image signals D1 to D4752 for each scanning line, while the printer module 200 receives the image signals D1 to D4752 for each scanning line, and forms an image by exposing these to light.

A central section of FIG. 22 shows in detail the situation after start of synchronizing when an image signal corresponding to an image on the 9th line is being read. In this figure, FIFO 157 is an image buffer for four scanning lines incorporated in the scanner module 100 and FIFO 257 is an image buffer for two scanning lines incorporated in the printer module 200. There is a fatal time delay of six scanning lines between reading and recording. This time lag generates a backward displacement of around 0.4 mm of phase during forming of a copy image. However, the phase difference is always constant, so that a displacement between color print sections will never occur. For practical purpose, this generates an error in the registration of recording paper, although the error is a very small one. However, this problem can be solved by delaying the timing of the recording paper feed and secondary transfer by six scanning lines, and an accurate registration of recording paper can be insured.

It should be noted that a memory capacity of the FIFO 147 in the scanner module 100 is set for four scanning lines and that of the FIFO 257 in the printer module 200 is set for two scanning lines. In addition, a slight difference exists between crystal oscillators 104a and 204a and this difference must be compensated for. Specifically, even if the frequency of the crystal oscillator 104a is slightly higher than that of the crystal oscillator 204a, such problems as skipping data to be read or overflow will never occur provided that the difference, when converted to the line synchronizing frequency and furthermore to a number of scanning lines, is in a range from 6720 lines to 6722 lines with an average of 6721 scanning lines.

Next, an image for one color is formed on the intermediate transfer belt 210. By repeating this process four times once per color, the synchronizing sequence described above is executed, and a color image without a color registration error is formed on the intermediate transfer belt 210. The final color image can be obtained by transferring the color image above to the recording paper 190, fixing it thereon, and discharging the recording paper.

In the embodiment described above, the system control module 300 integrated with the printer module 200 issues a manuscript picture scan command to the scanner module 100, and an image form command to the printer module 200. Accordingly, the printer module 200 synchronizes to the detection of the image tip by detection sensor 226 and issues a record data request signal to the scanner module 100. The scanner module 100 outputs image data read by resolving the manuscript image into pixels in the specified period of time t5 after said request signal is received from the printer module 200. Printer module 200, having issued the store data request signal, starts receiving record image data delayed by the specified period of time t5 from the detection of the image tip. With this scheme, registration of image tip to recording paper and registration of color image with the color print section can be maintained.

Furthermore, the scanner module 100 generates a image signal for each scanning line while synchronized to a signal generated by the first synchronizing signal generating section 104, while the printer module 200 forms an image from each scanning line while synchronized to a signal generated by the second synchronizing signal generating section. By synchronizing the first synchronizing signal generating section 104 to the second synchronizing signal generating section, it becomes possible, without using a buffer memory, to ensure that the size of a copy image accurately coincides with that of the manuscript picture and that color print sections are accurately aligned when forming a color image.

Figure 23:
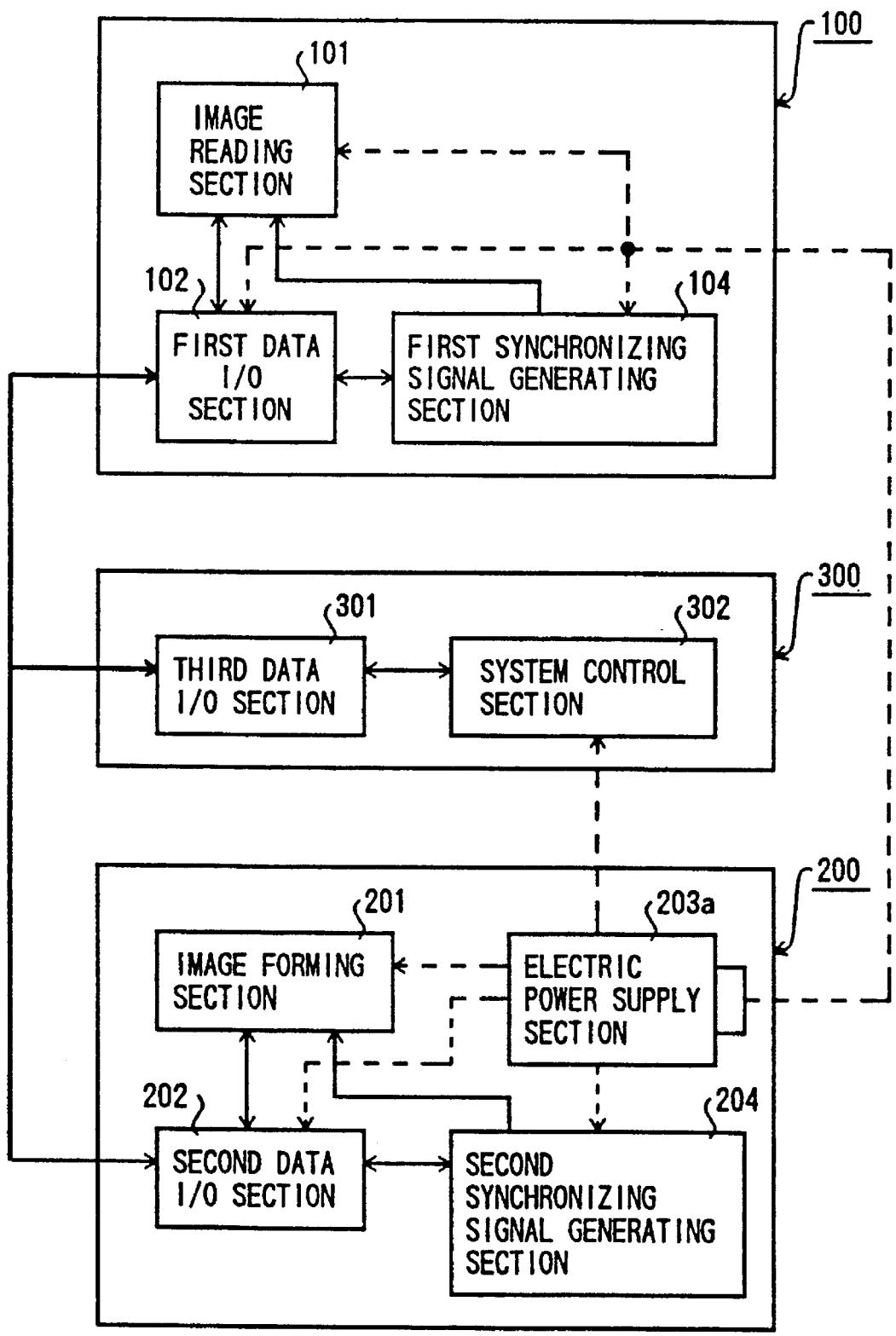
FIG. 23 is a block diagram illustrating basic components of the copying system according to the present invention.

FIG. 23 is a block diagram showing another embodiment of the copying system shown in FIG. 1, the difference being that in the copying system shown in this figure the first electric power supply section 103 in the scanner module 100 has been eliminated and power to scanner module 100 is supplied through a cable from the electric power supply section 203a in the printer module 200. With this configuration, the number of parts used in the entire system can be reduced, and the product cost can be reduced.

Figure 24:
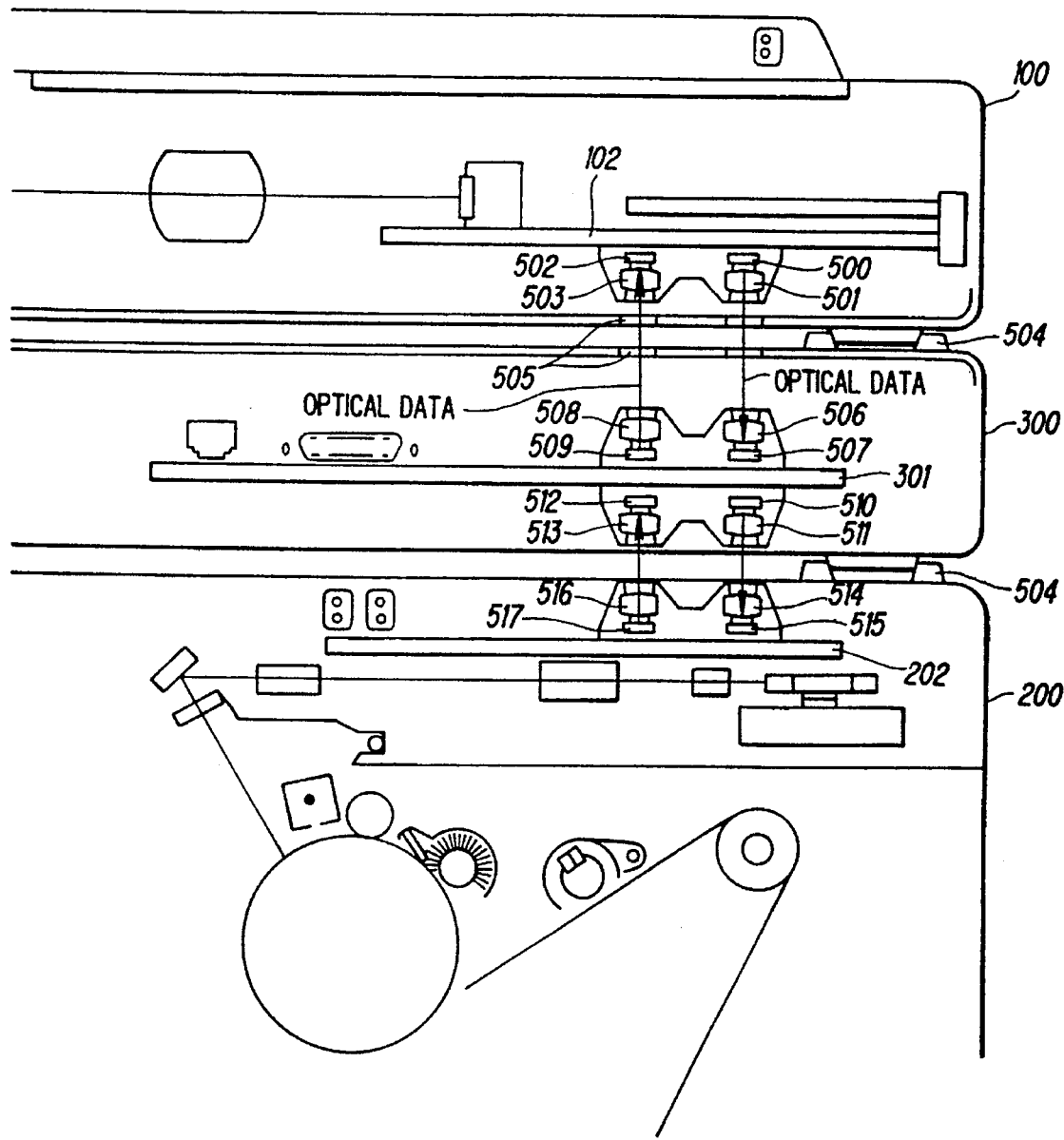
FIG. 24 is a diagram illustrating a configuration for sending and receiving data by means of light according to the present invention.
Figure 25:
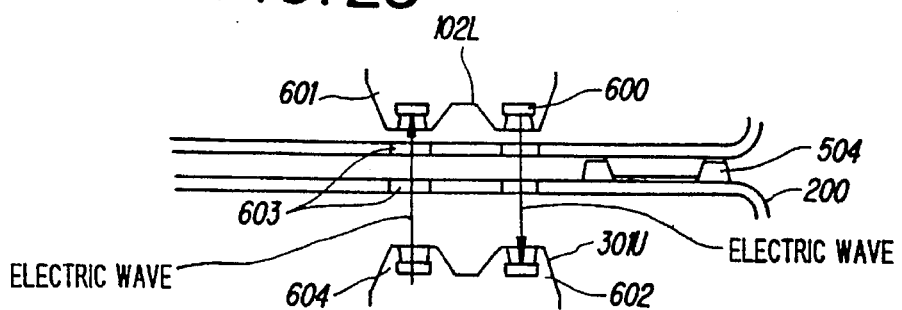
FIG. 25 is a diagram illustrating a configuration for sending and receiving data with electric waves according to the present invention.

FIG. 24 and FIG. 25 are diagrams illustrating a data transfer system between each module. FIG. 24 shows a data transfer system using light, while FIG. 25 shows a data transfer system using electric waves. In FIG. 24, scanner module 100 is provided with a light emitting element 500 (such as a light emitting diode, or a laser diode) for transmitting optical data, a lens 501 connected to the light emitting element 500, a light receiving element 502 (such as a photo diode) for receiving optical data, and a lens 503 connected to said light receiving element 502. Also, printer module 200 is provided with a light emitting element 517 for transmitting optical data, a lens 517 connected to said light receiving element 517, a light receiving element 515 for receiving optical data, and a lens 514 connected to said light receiving element 515.

Furthermore, in the system control module 300 are provided a light emitting element 509 for transmitting optical data to the scanner module 100 mounted on said system control module 300, a light receiving element 507 for receiving optical data, and a lens 506 connected to said light receiving element 507, a light emitting element 510 for returning optical data for the printer module 200 mounted under said system control module, a lens 511 connected to said light emitting element 510, a light receiving element 512 for receiving the optical data, and a lens 513 connected to said light receiving element 512.

The element 504 is an arranging means, wherein a convex section and a concave section are provided in modules positioned in the vertical direction respectively, and each module is fixed at a specified position by engaging the convex and concave sections respectively. Accordingly, the optical axis for light emission and that for light reception will coincide with each other while being alligned by the arranging means. It is preferable to widen the allowance for alignment in practical systems, by converting a light beam to a parallel light flux having, for instance, a width of around 5 mm. Therefore, beam expander lenses are preferably used for the lenses 501, 508, 511, and 516 in the light emitting side, and condenser lenses are used for the lenses 503, 506, 513, and 514 in the light receiving side to efficiently focus the receiving light into the light receiving element. It should be noted, that the reference numeral 505 indicates a space through which optical data is transferred.

In FIG. 25, elements 600 and 604 are antenna for transmission, and 601 and 602 are antenna for receiving. Element 603 is a space for transmission of electric waves. When transmitting electric waves in a full-duplexed communication system, antennas 600, 601, 602 and 604 each are capable of both transmission and reception. If an electric wave transfer path for the first pair is too close to an electric wave transfer path for the second pair, interference may be generated if the carrier for each path has the same frequency. However, interference can be prevented by using a carrier having a different frequency for each path, such as 350 MHz and 450 MHz, or by employing a system configuration in which the frequency is the same but the plane of polarization of each carrier crosses each other at right angles. Also, a system configuration in which each carrier has the same frequency but the electric wave paths for the first pair and the second pair are shielded with appropriate material such as metal is allowable.

Also, in a half-duplexed communication system, antennas for transmitting and receiving electric waves can be shared, and in that case signals are transmitted and received in a time-division fashion as in the SCSI system. Also, a ultrasonic system may also be employed.

Figure 26A:
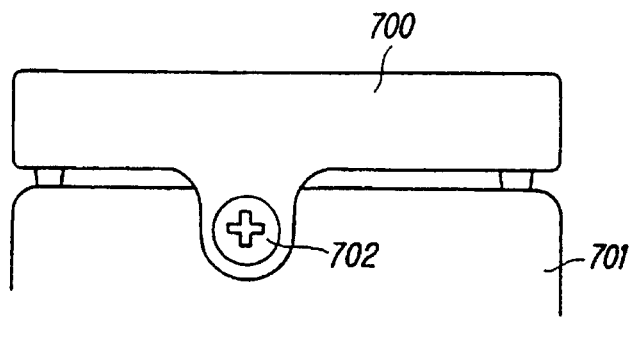
FIGS. 26A and 26B are diagrams illustrating an arranging means (based on a screw system) according to the present invention.
Figure 26B:
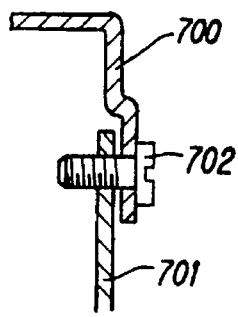
Figure 27:
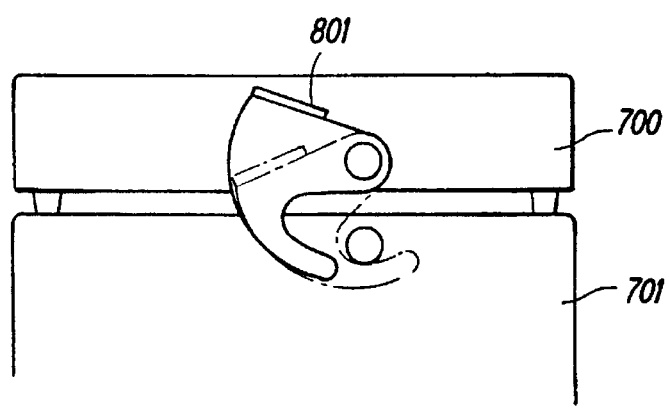
FIG. 27 is an explanatory view illustrating an arranging means (based on a hook system) according to the present invention.

FIG. 26A, FIG. 26B, and FIG. 27 show other embodiments of the arranging means described above, and in FIG. 26 the frames 700 and 701 for the modules stacked in the vertical direction are fixed and secured with a screw 702. In FIG. 27, frame 701 and frame 700 are arranged and fixed with a hook 801 provided in frame 700.

Further, since data is transmitted and received through a space by means of light, electric waves, or supersonic waves, using the arranging means, and without using any connections such as a cable, the ease of system configuration can be remarkably improved.

Obviously, numerous modifications and variations of the present invention are possible in light of the above teachings. It is therefore to be understood that within the scope of the appended claims, the invention may be practiced otherwise than as specifically described herein.

What is claimed is:

1. A copying system comprising:
   a scanner module formed as an independent frame, comprising,
      an image reading means for reading a manuscript picture by resolving a picture image into pixels and generating image data,
      a first data I/O means which is a first I/O interface for said image data and control data, and
      a first synchronizing signal generating means, for generating a first synchronization signal, comprising a first crystal oscillator,
   wherein said first I/O interface receives said image data and said first synchronization signal and transfers said control data to said image reading means and said first synchronization signal generating means, and said image reading means receives said first synchronization signal;
   a printer module formed as an independent frame, comprising,
      an image forming means for forming and outputting said image data as a permanent visual image on a recording medium,
      a second data I/O means which is a second I/O interface for said image data and said control data, and
      a second synchronizing signal generating means, for generating a second synchronization signal, comprising a second crystal oscillator,
   wherein said second I/O interface receives said image data and said second synchronization signal and transfers said control data to said image forming means and said second synchronization signal generating means, and said image forming means receives said second synchronization signal; and
   a system control module formed as an independent frame, comprising,
      a third data I/O means which is a third I/O interface for said image data and said control data, and
      a system control means for controlling said scanner module and said printer module synchronously and generating said control data;
   said third I/O interface transferring said control data to said first and second I/O interfaces; and said first and second crystal oscillator having substantially a same frequency, so that said first and second synchronization signals and said image reading and image forming means are synchronized with each other for maintaining coincidence between cycles and header phases of said image data that is read and formed.

2. A copying system according to claim 1, wherein said frame for said system control module is integrated with said frame of said scanner module or said frame of said printer module.

3. A copying system according to claim 1, further comprising a coupling means for fixing said frame of said system control module and said frame of said printer module or said scanner module so as to align said third data I/O section with said first and second data I/O sections.

4. A copying system according to claim 1, comprising a first electric power supply means in said frame of said scanner module and a second electric power supply means in said frame of said printer module and wherein said system control module receives power from said first or second power supply means.

5. A copying system according to claim 1, wherein said scanner module, printer module and system control module further comprise a transmitting and receiving means for transmitting and receiving said image and control data, each module is provided at a specified position by said fixing means so that said first, second, and third data I/O sections provided in each module are aligned through a space for data reception and transmission by means of any one of light waves, electric waves, and sonic waves through said space.

6. A copying system comprising:

a scanner module, formed as an independent frame, comprising, an image reader configured to read a manuscript picture by resolving a picture image into pixels, and configured to generate image data, a first data I/O device configured as a first I/O interface for said image data and control data, and a first synchronizing signal generator, configured to generate a first synchronization signal which controls operational timing of said image reader, comprising a first crystal oscillator, wherein said first I/O interface receives said image data and said first synchronization signal and transfers said control data to said image reader and said first synchronization signal generator, and said image reader receives said first synchronization signal;

a printer module, formed as an independent frame, comprising, an image former configured to form and output said image data as a permanent visual image on a recording medium, a second data I/O device configured as a second I/O interface for said image data and said control data, and a second synchronizing signal generator, configured to generate a second synchronization signal which controls operational timing of said image former, comprising a second crystal oscillator, wherein said second I/O interface receives said image data and said second synchronization signal and transfers said control data to said image former and said second synchronization signal generator, and said image former receives said second synchronization signal; and a system control module, formed as an independent frame, comprising, a third data I/O device configured as a third I/O interface for said image data and said control data, and a system controller configured to control said scanner module and said printer module synchronously, and to generate said control data;

said third I/O interface transferring said control data to said first and second I/O interfaces; and said first and second crystal oscillator having substantially a same frequency, so that said first and second synchronization signals and said image reader and image former are synchronized with each other, and configured to maintain coincidence between cycles and header phases of said image data that is read and formed.

7. A copying system according to claim 6, comprising:

a scanner module in which the first I/O interface includes an SCSI interface; and a host computer including an SCSI interface;

wherein the copying system is configured as a scanner and the first I/O interface directly communicates with the host computer via the SCSI interface to deliver read image data.

8. A copying system according to claim 6, comprising:

a printer module in which the second I/O interface includes an SCSI interface; and a host computer including an SCSI interface;

wherein the copying system is configured as a bit-map laser printer and the second I/O interface directly communicates with the host computer via the SCSI interface to obtain image data from the host computer to form a hard copy.

9. A copying system according to claim 6, comprising:

a scanner module in which the first I/O interface includes an SCSI interface;

a printer module in which the second I/O interface includes first and second SCSI interfaces; and a system control module in which the third I/O interface includes an SCSI interface, including a copy processor;

wherein the copying system is configured as a general copying machine, the scanner module is connected to the printer module via the first SCSI interface, the system control module is connected to the control module via the second SCSI interface, and the copy processor of the system control module controls the scanner module and the printer module to realize the general copying function.

10. A copying system according to claim 6, comprising:

a first scanner module in which the first I/O interface includes an SCSI interface, configured to handle a first paper size; and a second scanner module in which the first I/O interface includes first and second SCSI interfaces, configured to handle a second paper size;

a third scanner modules in which the first I/O interface includes first and second SCSI interfaces, configured as a color scanner;

a printer module in which the second I/O interface includes first and second SCSI interfaces; and a system control module in which the third I/O interface includes an SCSI interface, including a copy processor;

wherein the copying system is configured as a triple read copying machine, the SCSI interface of the first scanner module is connected to the first SCSI interface of the second scanner module, the second SCSI interface of the second scanner module is connected to the first SCSI interface of the third scanner module, the second SCSI interface of the third scanner module is connected to the first SCSI interface of the printer module, the second SCSI interface of the printer module is connected to the SCSI interface of the system control module, and the copy processor of the system control module controls the first, second and third scanner modules and the printer module to realize the triple read copying function.

11. A copying system according to claim 6, comprising:

a scanner module in which the first I/O interface includes an SCSI interface, configured as a color scanner;

a printer module in which the second I/O interface includes first and second SCSI interfaces;

a system control module in which the third I/O interface includes an SCSI interface module, including a computer interface port, a printer processor, an ISDN interface, and a color facsimile processor; and a host computer including an computer interface port;

wherein the copying system is configured as a high performance copier, color printer, and facsimile hybrid system, the scanner module is connected to the first SCSI interface of the printer module, the second SCSI interface of the printer module is connected to the SCSI interface of the system control module, the system control module is connected to the host computer via the computer interface port, the system control module is connected to a public ISDN line via the ISDN interface, and the printer processor converts print data in a page description language format received from the computer interface port to laster data, the color facsimile processor extracts data in a specified compression format received from the ISDN interface and compresses image data read by the scanner module in a specified format to realize the high performance copier, color printer, and facsimile hybrid system.

* * * * *